(12) United States Patent
Shimomura et al.

(10) Patent No.: US 8,670,465 B2
(45) Date of Patent: *Mar. 11, 2014

(54) RADIO COMMUNICATION METHOD AND A BASE STATION AND USER TERMINAL THEREOF

(75) Inventors: Tsuyoshi Shimomura, Kawasaki (JP); Dai Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/399,307

(22) Filed: Feb. 17, 2012

(65) Prior Publication Data

US 2012/0147837 A1 Jun. 14, 2012

Related U.S. Application Data

(63) Continuation of application No. 12/486,948, filed on Jun. 18, 2009, now Pat. No. 8,351,469, which is a continuation of application No. PCT/JP2006/325608, filed on Dec. 22, 2006.

(51) Int. Cl.
| | | |
|---|---|---|
| *H04B 3/10* | (2006.01) | |
| *H04L 5/00* | (2006.01) | |
| *H04J 3/14* | (2006.01) | |
| *H04W 72/04* | (2009.01) | |

(52) U.S. Cl.
CPC ......... *H04L 5/0048* (2013.01); *H04W 72/0406* (2013.01)
USPC .......................................... 370/491; 370/500

(58) Field of Classification Search
None
See application file for complete search history.

(56) References Cited

U.S. PATENT DOCUMENTS

| | | |
|---|---|---|
| 5,469,115 A | 11/1995 | Peterzell et al. |
| 2002/0136176 A1 | 9/2002 | Abeta et al. |
| 2004/0066802 A1 | 4/2004 | Ro et al. |
| 2004/0165650 A1 | 8/2004 | Miyazaki et al. |
| 2005/0226140 A1 | 10/2005 | Zhuang et al. |
| 2005/0232135 A1 | 10/2005 | Mukai et al. |

(Continued)

FOREIGN PATENT DOCUMENTS

| | | |
|---|---|---|
| CN | 1343408 | 4/2002 |
| CN | 1852274 | 10/2006 |

(Continued)

OTHER PUBLICATIONS

International Search Report and Written Opinion of International Application No. PCT/JP2006/325608, dated Apr. 10, 2007.

(Continued)

*Primary Examiner* — Eunsook Choi
(74) *Attorney, Agent, or Firm* — Myers Wolin, LLC

(57) ABSTRACT

A user terminal in a radio communication system, in which each of user terminals performs multiplexing of a data signal and a pilot signal and transmits the multiplexed signal to a base station using different data transmission band frequencies that are assigned by the base station, the user terminal includes a receiving unit that receives uplink resource information from a base station. A pilot generation unit that generates a pilot signal based on the uplink resource information and a transmitting unit that transmits the pilot signal generated by the pilot generation unit to the base station where the pilot generation unit includes a sequence generation unit that generates a Zadoff-Chu sequence as a pilot signal based on the uplink resource information and a subcarrier mapping unit that performs mapping of a sequence generated by cyclically copying the Zadoff-Chu sequence.

3 Claims, 26 Drawing Sheets

(56) References Cited

U.S. PATENT DOCUMENTS

| | | | |
|---|---|---|---|
| 2006/0035643 A1 | 2/2006 | Vook et al. | |
| 2006/0050799 A1 | 3/2006 | Hou et al. | |
| 2007/0004465 A1 | 1/2007 | Papasakellariou et al. | |
| 2007/0195906 A1* | 8/2007 | Kim et al. | 375/267 |
| 2007/0297381 A1 | 12/2007 | Oketani et al. | |
| 2008/0075195 A1* | 3/2008 | Pajukoski et al. | 375/298 |
| 2008/0101306 A1* | 5/2008 | Bertrand et al. | 370/336 |
| 2008/0123616 A1* | 5/2008 | Lee | 370/344 |
| 2009/0052470 A1 | 2/2009 | Yun et al. | |
| 2009/0268695 A1* | 10/2009 | Zhao et al. | 370/336 |
| 2009/0310549 A1 | 12/2009 | Higuchi et al. | |
| 2012/0113931 A1 | 5/2012 | Inoue et al. | |

FOREIGN PATENT DOCUMENTS

| | | |
|---|---|---|
| EP | 1158709 A1 | 11/2001 |
| JP | 2001-197037 | 7/2001 |
| JP | 2004-253899 | 9/2004 |
| JP | 2005-294895 | 10/2005 |
| JP | 2007-043332 | 2/2007 |
| JP | 2007-074224 | 3/2007 |
| JP | 2007-089113 | 4/2007 |
| JP | 2007-336437 | 12/2007 |
| JP | 2008-118311 | 5/2008 |
| RU | 2 111 619 | 5/1998 |
| WO | 92/10890 | 6/1992 |
| WO | 2004/059880 | 7/2004 |
| WO | 2005/022811 | 3/2005 |
| WO | 2006052103 A1 | 5/2006 |
| WO | 2006/109492 | 10/2006 |
| WO | 2006/129166 | 12/2006 |
| WO | 2007/122828 | 11/2007 |

OTHER PUBLICATIONS

3GPP TR 25.814 V7.0.0 (Jun. 2006); "3rd Generation Partnership Project; Technical Specification Group Radio Access Network; Physical layer aspects for evolved Universal Terrestrial Radio Access (UTRA)"; (Release 7); Dated Jun. 2006.
Branislav M. Popovic; "Generalized Chirp-Like Polyphase Sequences with Optimum Correlation Properties"; IEEE Transactions on Information Theory vol. 38, No. 4, Jul. 1992; pp. 1406-1409.
Texas Instruments; "Text Proposal on Uplink Reference Signal Structure" Agenda Item: 13.2.2.2; Document for: Discussion and Decision; 3GPP TSG-RAN WG1 LTE Meeting; Denver, USA; Jan. 13-17, 2006 [R1-060374] pp. 1-4.
The Patent Office of the Russian Federation, Official Office Action for corresponding Russian Patent Application No. 2009128201/09 (039177), issued Feb. 24, 2010. English translation attached.
Korean Intellectual Property Office Notice of Preliminary Rejection for corresponding Korean Patent Application No. 10-2009-7008911, mailed Oct. 6, 2010. English translation attached.
The State Intellectual Property Office of China "First Notification of Office Action and First Office Action", issued for corresponding Chinese Patent Application No. 200680056539.2, dated Jan. 27, 2011. English translation attached.
Russian Patent Office "Decision on Grant A Patent Invention" issued for corresponding Russian Patent Application No. 2009128201/09(039177), dated Apr. 18, 2011. English translation attached.
Office Action issued by the U.S. Patent and Trademark Office on Nov. 16, 2011, for parent application U.S. Appl. No. 12/486,948.
The extended European search report includes European search opinion, issued for corresponding European Patent Application No. 06843067.7 dated Jan. 5, 2012.
Official Office Action issued by the Patent Office of the Russian Federation for corresponding Russian Application No. 2010153351/07 dated Dec. 24, 2010.

The State Intellectual Property Office of China 3rd Notification of Office Action issued for corresponding Chinese Patent Application No. 200680056539.2 issued Feb. 16, 2012 with English Translation.
First Notification Office Action issed by the State Intellectual Property Office of China for corresponding Chinese Patent Application No. 201110156336.3 issued Feb. 29, 2012 with English translation.
Official Non Final Office Action issued by the USPTO for corresponding U.S. Appl. No. 12/486,948 notified electronically on Apr. 19, 2012.
Office Action issued for corresponding Russian Patent Application No. 2011127409 issued Apr. 23, 2012 with English translation.
Fourth (4th) Notification of Office Action issued for corresponding Chinese Patent Application No. 200680056539.2, issue date Jul. 11, 2012 with English translation.
Hee Wook Kim et al.; "Efficient Time and Frequency Offset Estimation for OFDM based MSS Systems"; VTC-2006 IEEE 64th; Sep. 25-28, 2006; p. 1-5.
Patent Examination Report No. 1 issued for corresponding Australian Patent Application No. 2011201792 issued Jul. 13, 2012.
Non-Final Office Action issued by the United States Patent and Trademark Office for corresponding U.S. Appl. No. 13/549,826, mailed Oct. 3, 2012.
Zhou et al, "A Novel Timing Synchronization Method for Localized OFDMA Uplink System", Jun. 2006, IEEE International Conference on Communications ICC 2006, vol. 11, pp. 5086-5090, Beijing, China.
Canadian Office Action issued for corresponding Canadian Patent Application No. 2,776,257, dated Mar. 26, 2013.
Second Notification of Office Action issued for corresponding Chinese Patent Application No. 201110156336.3 issued Jan. 16, 2013 with English translation.
Motorola; "EUTRA SC-FDMA Uplink Pilot/Reference Signal Design"; Agenda Item: 6.4.2; R1-063057; Nov. 6-10, 2006; 3GPP RAN WG1 #47; Riga, Latvia.
Fujitsu; "Structure of uplink reference signal"; Agenda Item: 6.6.2. Uplink reference signals; R1-070365; Jan. 15-19, 2007; 3GPP TSG RAN WG1 #47bis meeting; Sorrento, Italy.
Nokia; "CAZAC Sequence Length for E-UTRA UL"; Agenda Item: 6.4.2; R1-063369; Nov. 6-10, 2006; 3GPP TSG RAN WG1 #47; Riga, Latvia.
The extended European search report includes the European search report or the partial European search report/declaration of no search and the European search opinion issued for corresponding European Patent Application No. 12183943.5, dated Mar. 11, 2013.
Final Office Action issued by the United States Patent and Trademark Office for corresponding U.S. Appl. No. 13/549,826, electronically delivered Mar. 15, 2013.
NTT Docomo et al., "Orthogonal Pilot Channel Structure for E-UTRA Uplink", Agenda Item: 10.2.1, Mar. 27-31, 2006, 3GPP TSG-RAN WG1 Meeting #44bis, R1-060784 (original R1-060046), Athens, Greece.
Texas Instruments, "Comparison of Proposed Uplink Pilot Structures for SC-OFDMA", Agenda Item: 10.2.1, Mar. 27-31, 2006, 3GPP TSG-RAN WG1 #44bis, R1-060925, Athens, Greece.
Notification of Reasons for Refusal issued for corresponding Japanese Patent Application No. 2011-161603, dispatched on Jun. 4, 2013, with English translation.
Czylwik, "Low overhead pilot-aided synchronization for single carrier modulation with frequency domain equalization", "The Bridge to Global Integration", Global Telecommunications Conference, 1998, GLOBECOM 1998, Nov. 8-12, 1998, pp. 2068-2073, vol. 4, IEEE, Sydney, NSW.
Office Action issued for corresponding Canadian Patent Application No. 2,673,284, dated Apr. 29, 2013.
Non-Final Office Action issued by the United States Patent and Trademark Office for corresponding U.S. Appl. No. 13/549,826, electronically delivered Aug. 6, 2013.

* cited by examiner

FIG. 1
(A)
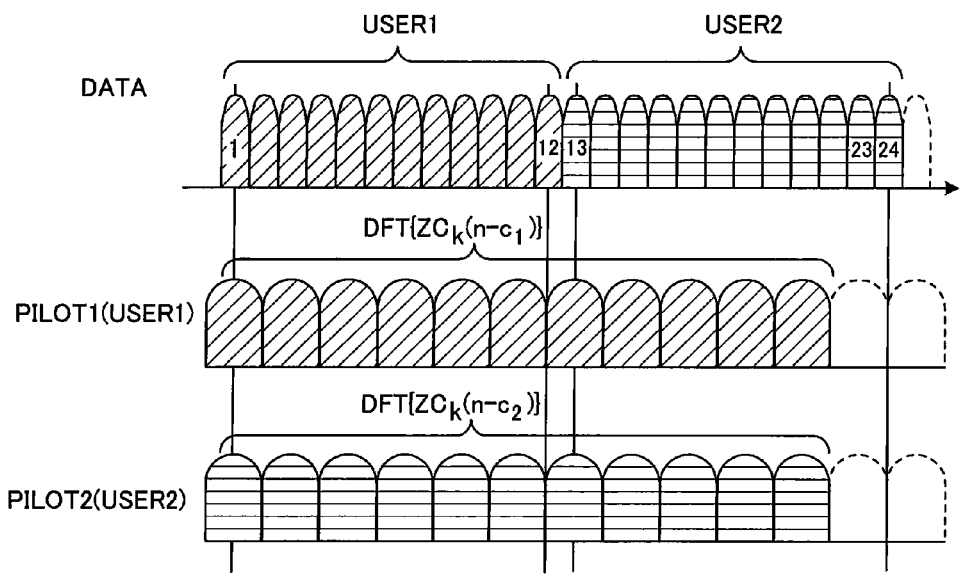
(B)
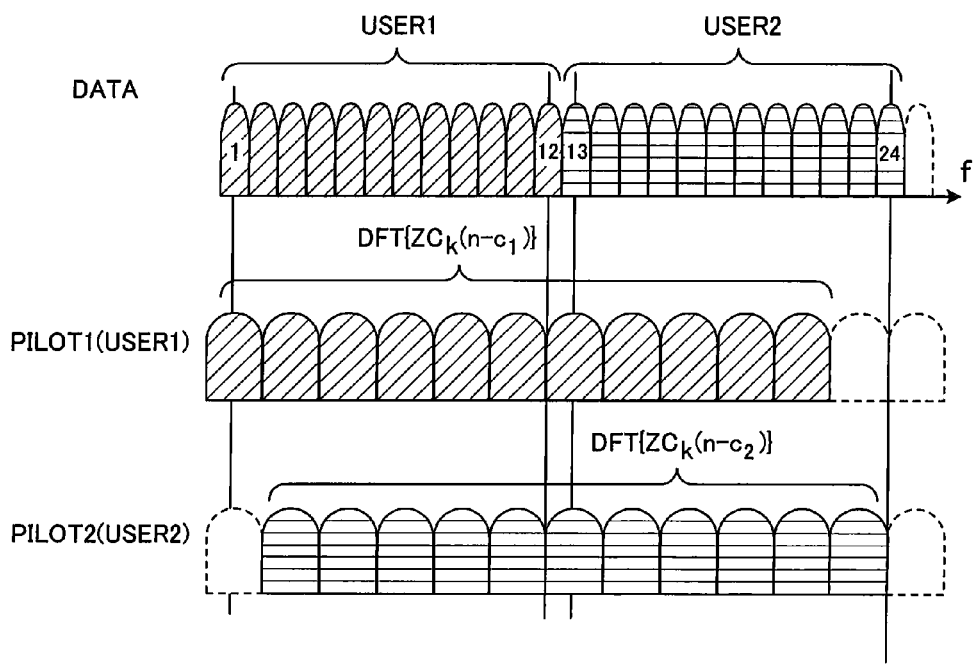

FIG. 2
(A)
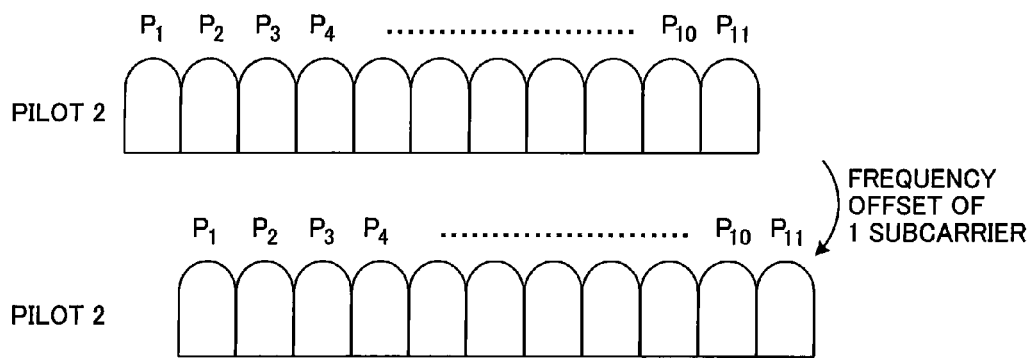
(B)
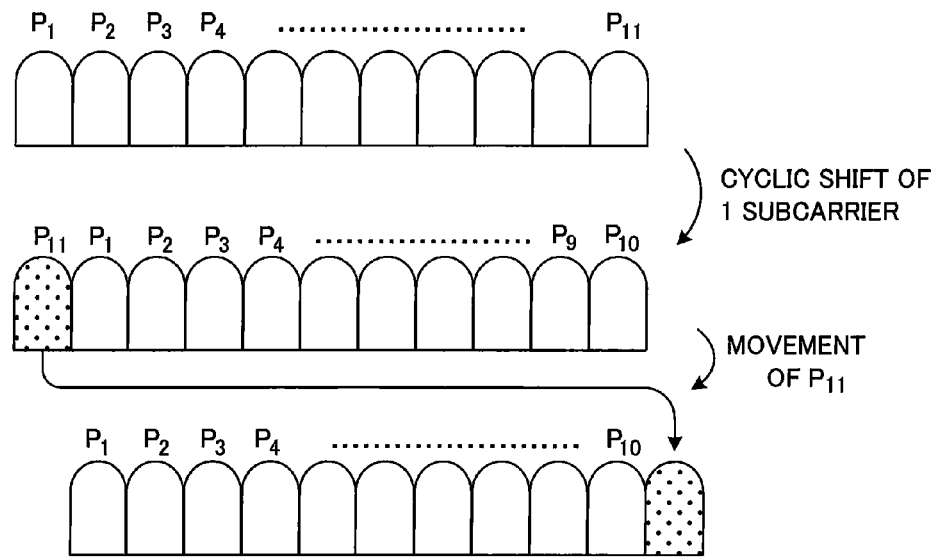

FIG. 27 PRIOR ART
(A)
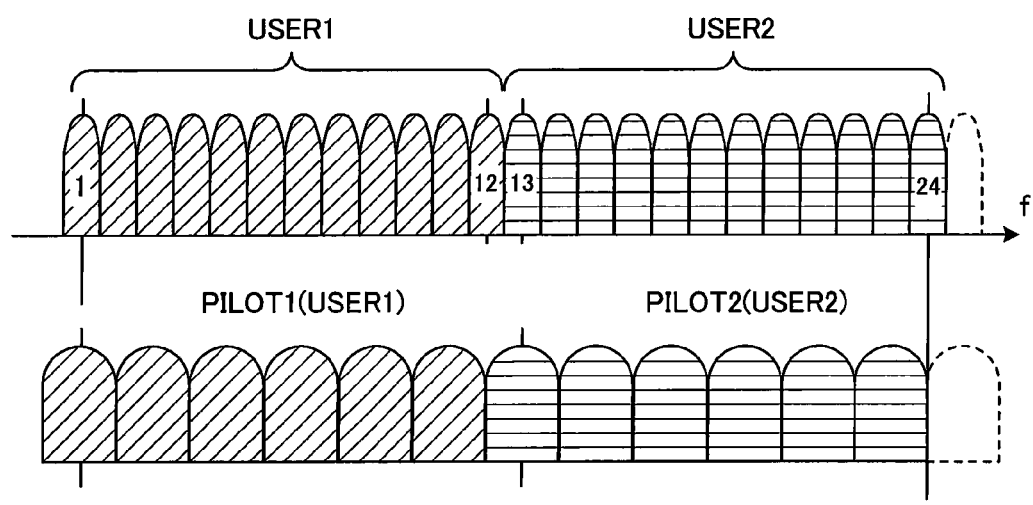
(B)
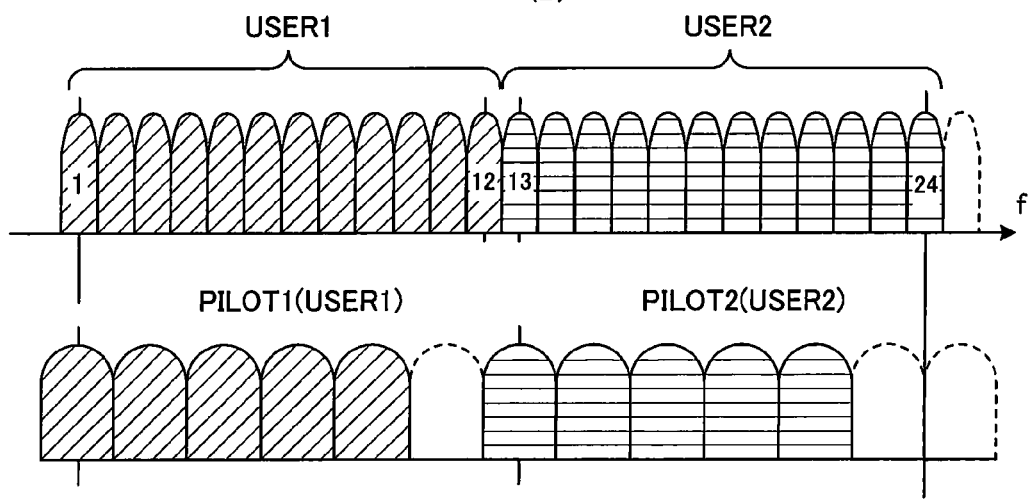

RADIO COMMUNICATION METHOD AND A BASE STATION AND USER TERMINAL THEREOF

CROSS REFERENCE TO RELATED APPLICATION

The present application is a continuation of U.S. application Ser. No. 12/486,948, filed Jun. 18, 2009, now pending, which is a continuation of International Application of PCT/JP2006/325608, filed on Dec. 22, 2006, the contents of each are herein wholly incorporated by reference.

BACKGROUND OF THE INVENTION

The present invention relates to a radio communication method and a base station and user terminal thereof, and more particularly to a radio communication method and a base station and user terminal thereof in a radio communication system in which each user terminal uses different data transmission band frequencies that are assigned from a base station to transmit data signals to that base station, and performs time-division multiplexing of pilot signals onto the data signal and transmits the resulting signal to the base station.

In a radio communication system such as a cellular system, the receiving side typically uses a known pilot signal to perform timing synchronization and propagation path estimation (channel estimation), and based on each of these, performs data demodulation. Moreover, in an adaptive modulation method that makes it possible to improve throughput by adaptively changing the modulation method or encoding rate according to the channel quality, the receiving side also uses the pilot signal when estimating the channel quality, for example the signal to interference ratio (SIR), in order to decide the optimal modulation method or optimal encoding rate.

As a radio communication access method that is strong against frequency selective fading due to multipaths in broadband radio communication, is the OFDM (Orthogonal Frequency Division Multiplexing) method. However, from the aspect of the power efficiency of the terminal, there is a problem that the PAPR (Peak to Average Power Ratio) of the transmission signal is large, so OFDM is not suited as a method for UP link transmission. Therefore, in the next-generation cellular system 3GPP LTE, single-carrier transmission is performed as the uplink transmission method, where the receiving side performs frequency equalization (refer to 3GPP TR25814-700 FIG. 9.1.1-1). Single-carrier transmission means that transmission data and pilot signals are multiplexed only on the time axis, and when compared with OFDM that multiplexes data and pilot signals on the frequency axis, it is possible to greatly reduce the PARR.

Single-Carrier Transmission

FIG. 23 is an example of the frame format of single-carrier transmission, and FIG. 24 is a drawing explaining frequency equalization. A frame comprises data DATA and pilots PILOT having N number of samples each and that are time multiplexed, where in FIG. 23 two pilot blocks are inserted in one frame. When performing frequency equalization, a data/pilot separation unit 1 separates data DATA and pilots PILOT, and a first FFT unit 2 performs FFT processing on N samples of data to generate N number of frequency components, and inputs the result to a channel-compensation unit 3. A second FFT unit 4 performs FFT processing on N samples of pilot to generation N number of frequency components, and a channel estimation unit 5 uses those N number of frequency components and N number of frequency components of a known pilot to estimate the channel characteristics for each frequency, and inputs a channel-compensation signal to the channel-compensation unit 3. The channel-compensation unit 3 multiplies the N number of frequency components that were output from the first FFT unit 2 by the channel-compensation signal for each frequency to perform channel compensation, and an IFFT unit 6 performs IFFT processing of the N number of channel-compensated frequency components, then converts the signal to a time signal and outputs the result.

CAZAC Sequence

In single-carrier transmission, when the receiving side performs frequency equalization, in order to improve the accuracy of channel estimation in the frequency domain, it is preferred that the pilot signal has a constant amplitude in the frequency domain, or in other words, that the auto correlation after an arbitrary cyclic time shift be '0'. On the other hand, from the aspect of the PAPR, it is preferred that a pilot signal has a constant amplitude in the time domain as well. A pilot sequence that makes these features possible is a CAZAC (Constant Amplitude Zero Auto Correlation) sequence, and in the 3GPP LTE system, application of this CAZAC sequence as the uplink pilot is decided. The CAZAC sequence has ideal auto correlation characteristics, so pilot signals that are obtained by cyclically shifting the same CAZAC sequence are orthogonal to each other. In the 3GPP LTE system, a method of using CAZAC sequences having different amounts of cyclic shift to multiplex the pilot signals of different users, or to multiplex pilot signals from the same user but transmitted from different antennas is adopted and it is called CDM (Code Division Multiplexing).

A Zadoff-Chu sequence, which is a typical CAZAC sequence, is expressed by Equation (1) (refer to B. M. Popovic, "Generalized Chirp-Like Polyphase Sequences with Optimum Correlation Properties", IEEE Trans. Info. Theory, Vol. 38, pp. 1406-1409, July 1992).

$$ZC_k(n)=\exp\{-j2\pi k/L \cdot (qn+n(n+L\%2)/2)\} \quad (1)$$

Here, k and L are both prime, and express the sequence number and sequence length, respectively. Moreover, n is the symbol number, q is an arbitrary integer, and L %2 is the remainder when divided by 2, and may be notated as L mod (2). When the factorization into prime numbers of L is taken to be $$L=g_1^{e1} \times \ldots \times g_n^{en} \quad (2)$$

(gi is a prime number), the number of CAZAC sequences can be given by the following equation.

$$\phi(L) = L\left(1 - \frac{1}{g_1}\right) \times \ldots \times \left(1 - \frac{1}{g_n}\right) \quad (3)$$

More specifically, in the case where L=12, L=12=$2^2 \times 3^1$, so $g_1$=2, e1=2, $g_2$=3 and e2=1, and from Equation (3), the number of sequences (CAZAC sequences) becomes 4. Therefore, the number of sequences increases the larger L is and the fewer number of prime factors there is. In other words, in the case where L is a prime number, the number of CAZAC sequences $\phi(L)$ becomes (L−1).

$ZC_k$(n−c), for which only c in the CAZAC sequence $ZC_k$(n) is cyclically shifted, is expressed by the following equation.

$$ZC_k(n-c)=\exp\{-j2\pi k/L \cdot (q(n-c)+(n-c)(n-c+L\%2)/2)\} \quad (4)$$

As is shown in Equation (5) below, $$|R(\tau)| = \begin{cases} 1 & \ldots\ \tau = c \\ 0 & \ldots\ \tau \neq c \end{cases} \quad (5)$$

the correlation $R(\tau)$ between $ZC_k(n)$ and $ZC_k(n-c)$ becomes '0' at any point except where $\tau=c$, so sequences that are obtained by applying different amounts of cyclic shift to the main sequence $ZC_k(n)$ become orthogonal to each other.

When a radio base station receives a plurality of pilots that were multiplexed by CDM (Code Division Multiplex) using the cyclic shift, by taking the correlation with the main sequence, it is possible to separate the pilots based on the location where the peak occurs. The ability to tolerate shifting of the multipath or shifting of the reception timing decreases the narrower the interval of the cyclic shift is, so there is an upper limit to the number of pilots that can be multiplexed by cyclic shift. When the number of pilots that are multiplexed by cyclic shifting is taken to be P, the amount of cyclic shifting cp that is assigned to the pth pilot can be determined, for example, by the equation given below (refer to 3GPP R1-060374, "Text Proposal On Uplink Reference Signal Structure", Texas Instruments).

$$c_p = (p-1)*\{L/P\}, \text{ where } p=1 \ldots P \quad (6)$$

As was described above, in a 3GPP LTE uplink, pilots and data are multiplexed by time-division multiplexing and transmitted by the SC-FDMA (Single Carrier-Frequency Division Multiple Access) method. FIG. 25 is a drawing showing the construction of a SC-FDMA transmission unit, where 7' is a $N_{TX}$ sized DFT (Discrete Fourier Transformer), 8' is a subcarrier mapping unit, 9' is a $N_{FFT}$ sized IDFT unit, and 10 is CP (Cyclic Prefix) insertion unit. In 3GPP LTE, in order to suppress the amount of processing, $N_{FFT}$ is an integer that is a power of 2, and the IDFT after subcarrier mapping is replaced by IFFT.

The process of adding a cyclic shift c to the main sequence $ZC_k(n)$ can be performed either before DFT or after IFFT. When the process is performed after IFFT, the cyclic shift can be an amount $c \times N_{FFT}/N_{TX}$ samples. Essentially, the process is the same process, so hereafter, an example will be explained in which the cyclic shift process is performed before DFT.

PROBLEMS WITH THE RELATED ART

In order to reduce inter-cell interference, it is necessary to repeatedly use CAZAC sequences having different sequence numbers as pilots between cells. This is because as the number of repetitions increases, the distance between cells that use the same sequence becomes larger, so the possibility of severe interference occurring decreases. Therefore, it becomes necessary to maintain a lot of CAZAC sequences, and in order to have good characteristics for the CAZAC sequences, a sequence length L that is a large prime number is desirable. FIG. 26 is a drawing explaining inter-cell interference, where in the case as shown in (A), in which the number of CAZAC sequences that can be used is 2, CAZAC sequences ($ZC_1$) having the same sequence number are used in adjacent cells, so severe interference occurs between the adjacent cells. Moreover, as shown in (B), when the number of CAZAC sequences is 3, CAZAC sequences having the same sequence number are not used, however, the number of repetitions is 3, which is a small number, so the distance between cells that use CAZAC sequences having the same sequence number is short and there is a high possibility that interference will occur between adjacent cells. In the case shown in (C), where the number of CAZAC sequences is 7, the number of repetitions is 7, which is a large number, so as the distance between cells that use CAZAC sequences having the same sequence number becomes larger, the possibility of interference occurring gradually decreases.

Incidentally, as shown in (A) of FIG. 27, the trend of 3GPP LTE discussion is to take the number of subcarriers that are occupied by data a multiple of 12, and to take the subcarrier interval for pilots double the subcarrier interval for data in order to improve the transmission efficiency. In that case, when the sequence length L of the CAZAC sequence is 6, the number of sequences $\phi(L)$ becomes 2(k=1, 2), and CAZAC sequences having the same sequence number are used, so pilot interference occurs between adjacent cells. Moreover, when the sequence length L is taken to be 5, $\phi(L)$ becomes 4(k=1, 2, 3, 4), which is still a small number, however, as shown in (B) of FIG. 27, there are subcarriers of data that are not covered by a pilot, so the channel estimation accuracy decreases.

Therefore, it is thought that by making the transmission band for pilot signals broader than the transmission band for data and performing transmission, a sufficient sequence length L will be maintained (refer to 3GPP R1-060925, R1-063183). FIG. 28 is an example of the case in which the number of multiplexed pilot signals is 2. If the sequence length L is taken to be 12, the number of CAZAC sequences is only 4 from the equations (2) and (3), and the inter-cell interference becomes large (k=4). Therefore, the sequence length L is made to be the prime number 11. When L=11, $\phi(L)$ is 10 and 10 CAZAC sequences can be used (k=1~10), so it is possible to reduce the inter-cell interference. The sequence length L cannot be made to be 13 or greater. The reason for that is that when the sequence length L is 13 or greater, interference occurs between adjacent frequency bands.

Pilot signals from different users are multiplexed by CDM through cyclic shifting. In other words, a CAZAC sequence $ZC_k(n)$ having a length L=11 and for which cyclic shifting c1 has been performed is used as the pilot for a user 1, and a CAZAC sequence $ZC_k(n)$ for which cyclic shifting c2 has been performed is used as the pilot for a user 2.

However, when a CAZAC sequence $ZC_k(n)$ having a length L=11 is cyclically shifted and used for the users 1, 2, then as can be clearly seen in FIG. 28, the relative relationship between the transmission frequency band for the pilots and the transmission frequency band for data for user 1 and user 2 differs, and thus the channel estimation accuracy is different. In other words, subcarriers 23, 24 of the transmission frequency band for data of user 2 deviates from the transmission frequency band for the pilots, and the channel estimation accuracy for those subcarriers decreases.

In FIG. 28, based on the current 3GPP LTE specifications, the subcarrier interval for pilots is double the subcarrier interval for data, however, the problem described above occurs even when the ratio of the subcarrier intervals is changed.

SUMMARY OF THE INVENTION

Taking the aforementioned problems into consideration, it is the object of the present invention to enable accurate channel estimation of data subcarriers that deviate from the pilot transmission frequency band.

Another object of the present invention is to enable accurate channel estimation of subcarriers assigned to each user even when a specified sequence (for example, CAZAC sequence $ZC_k(n)$), for which different amounts of cyclic shifting has been performed, is used as pilots of users to be multiplexed.

Another object of the present invention is to enable accurate channel estimation by separating pilots for each user using a simple method, even when a specified CAZAC sequence, for which different amounts of cyclic shifting has been performed, is used as pilots of users to be multiplexed.

Another object of the present invention is to increase the accuracy of channel estimation of the data subcarriers of a user even when the condition of the propagation path of that user is poor.

The present invention is a radio communication method, a base station and a user terminal in a radio communication system in which each of user terminals together with transmitting data signal to a base station using different data transmission band frequencies that are assigned by the base station, performs time-division multiplexing of a pilot signal with the data signal and transmits the resulting signal to the base station.

Radio Communication Method

The radio communication method of the present invention comprises: a step of deciding pilot transmission band each user terminal so that pilot transmission band covers the data transmission band of the user terminal, by frequency offset; and a step of instructing each user terminal to transmit the pilot signal using the frequencies of said decided pilot transmission band.

The instruction step comprises: a step of calculating an amount of frequency offset for each user terminal, and an amount of cyclic shift of the CAZAC sequence corresponding to the number of multiplexed user terminals and the amount of the frequency offset; and a step of instructing each user terminal to perform cyclic shift of said CAZAC sequence used as the pilot signal by the calculated cyclic shift amount, and instructing the user terminal to perform frequency offset of the pilot transmission band by the calculated frequency offset amount.

The radio communication method further comprises: a step of adding, when the base station received multiplexed pilot signals that were sent from a plurality of user terminals, the frequency components of the portion of the pilot signals that do not overlap each other; a step of multiplying a combination of the added result and the received multiplexed pilot signals by a replica of the pilot signal in a frequency-domain; and a step of converting the replica multiplication results to a time-domain signal, then separating out the signal portion of a specified user terminal from that time-domain signal and performing channel estimation.

The radio communication method of the present invention further comprises: a step of acquiring the propagation path conditions of the user terminals; and a step of assigning preferentially a middle band of the whole data transmission band as the data transmission band for a user terminal having a poor propagation path condition, and notifying the user terminals. Alternatively, the radio communication method of the present invention further comprises: a step of performing hopping control by periodically assigning a middle band and an end band of the whole data transmission band as the data transmission bands for the user terminals.

Base Station

The base station of the present invention comprises a resource management unit that decides pilot transmission band for each user terminal so that the pilot transmission band covers the data transmission band of the user terminal by frequency offset, and instructs the user terminal to transmit the pilot signal using the frequencies of said decided pilot transmission band.

In the base station, the resource management unit comprises: a cyclic shift amount calculation unit that calculates an amount of frequency offset for each user terminal, and an amount of cyclic shift of the CAZAC sequence that corresponds to the number of multiplexed user terminals and the amount of the frequency offset; and an instruction unit that together with instructing each user terminal to perform a cyclic shift of said CAZAC sequence used as the pilot signal by the calculated cyclic shift amount, instructs the user terminal to perform frequency offset of the pilot signal by the frequency offset amount.

The base station further comprises a channel estimation unit that performs channel estimation for each user terminal; and wherein the channel estimation unit comprises: a receiving unit that receives multiplexed pilot signals that are transmitted from a plurality of user terminals; an addition unit that adds the frequency components of the portion of the pilot signals that do not overlap each other; a replica multiplication unit that multiplies a combination of the addition results and the received multiplexed pilot signals by a replica of the pilot signal in a frequency-domain; a conversion unit that converts the replica multiplication result to a time-domain signal; a separation unit that separates out the signal portion of each user terminal from the time-domain signal; and an estimation unit that converts the separated time-domain signal to a frequency-domain signal to estimate channel of each frequency.

The resource management unit acquires the propagation conditions of the user terminals, and assigns preferentially a middle band of the whole data transmission band as the data transmission band for a user terminal having a poor propagation path condition, and notifies the user terminal. Alternatively, the resource management unit performs hopping control by periodically assigning a middle band and an end band of the whole data transmission band as the data transmission bands for the user terminals.

User Terminal

The user terminal of the radio communication system comprises: a receiving unit that receives uplink resource information from a base station; and a pilot generation unit that generates a pilot according to instructions in the uplink resource information; wherein the pilot generation unit comprises: a CAZAC sequence generation unit that, based on the resource information, generates a CAZAC sequence having a specified sequence length and sequence number as a pilot signal; a first conversion unit that converts the CAZAC sequence, which is a time-domain pilot signal, into a frequency-domain pilot signal; a subcarrier mapping unit that performs mapping of the subcarrier components of the pilot signal based on frequency offset information that is included in the resource information; a second conversion unit that converts the pilot signal with mapped subcarriers into a time-domain signal; and a cyclic shift unit that performs a cyclic shift on the CAZAC sequence based on a cyclic shift amount that is included in the resource information, either before the first conversion or after the second conversion.

BRIEF DESCRIPTION OF THE DRAWINGS

FIG. 1 is a drawing explaining a first principle of the present invention.

FIG. 2 is a drawing explaining a second principle of the present invention.

FIG. 27 is a first drawing explaining a conventional data transmission band and pilot transmission band.

DESCRIPTION OF THE PREFERRED EMBODIMENTS (A) Principles of the Invention

Figure 28:
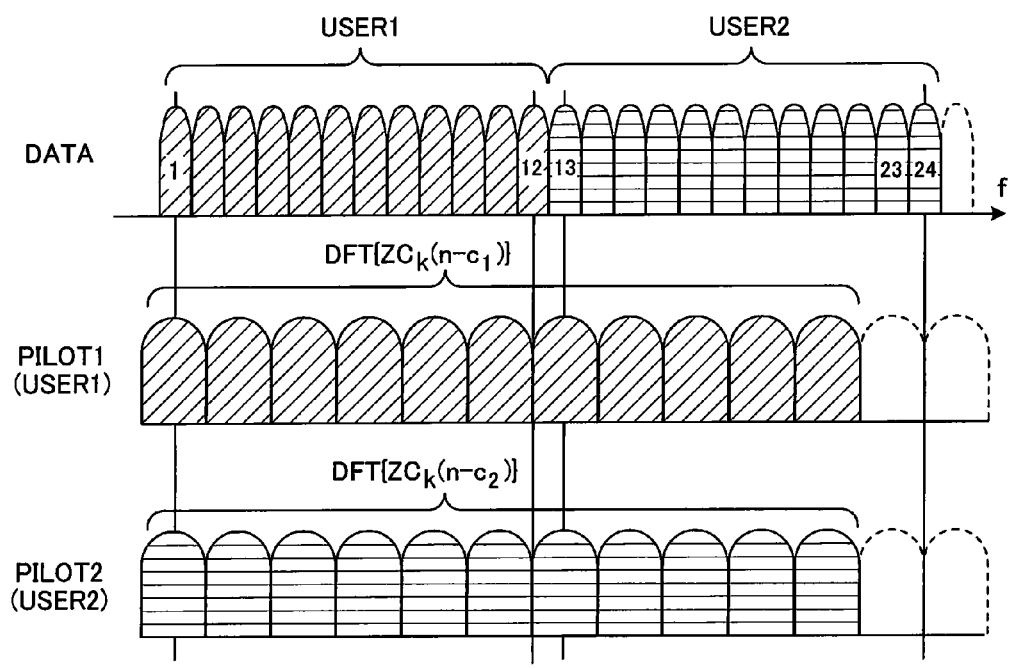
FIG. 28 is a second drawing explaining a conventional data transmission band and pilot transmission band.

As shown in (A) of FIG. 1, when a CAZAC sequence $ZC_k(n)$ to which a cyclic shift c1 has been performed is used as the pilot for a user 1, and a CAZAC sequence $ZC_k(n)$ to which a cyclic shift c2 has been performed is used as the pilot for a user 2, then as was explained using FIG. 28, the subcarriers 23, 24 of the transmission frequency band for data of user 2 deviates from the transmission frequency band for the pilot, and the channel estimation accuracy for that subcarrier decreases. In FIG. 1, DFT{ZCk(n−c1)} and DFT{ZCk(n−c2)} are the pilots that are obtained by performing cyclic shifts c1, c2 of a CAZAC sequence ZCk(n) having a length L=11, after which DFT processing is performed on the sequences ZCk(n−c1) and ZCk(n−c2).

Therefore, as shown in (B) of FIG. 1, by giving a frequency offset to the pilots of each user to correspond to the transmission band and then multiplexing the pilots, the transmission band for the pilots will always cover the transmission band for the data. In the example shown in (B) of FIG. 1, the pilot DFT{ZCk(n−c2)} for user 2 can be offset the amount of one subcarrier.

However, when the pilot DFT{ZCk(n−c2)} is offset, on the receiving side the correlation between the received pilot and replica ZCk(n) of a known pilot does not reach a peak at τ=c2, and the location of the peak shifts, so it is not possible to correctly restore the pilot, and as a result channel estimation is not possible. The reason that the location of the correlation peak shifts will be explained below.

Relationship Between the Frequency Offset and Cyclic Shift in the Time Domain

First, the relationship between the frequency offset and cyclic shift in the time domain will be explained. Taking the result of performing DFT conversion on the CAZAC sequence ZCk (n) to be F(m), F(m) can be expressed by the equation below.

$$F(m) = \sum_{n=0}^{L-1} ZC(n) \cdot \exp\{-j2\pi mn/L\} \quad (7)$$

Using Equation (7) and Equation 4, the equation can be transformed to obtain the equation below.

$$\exp\{-j\theta_{k,c}\} \cdot F(m-d) = \sum_{n=0}^{L-1} ZC(n-c) \cdot \exp\{-j2\pi mn/L\} \quad (8)$$

where $$kc = d(\mathrm{mod}L), \theta_{k,c} = \pi k/L \cdot (c^2 - 2qc - c \cdot L \%2)$$

Here, d(mod L) means that kc and d have the same remainder after dividing by the modulus L.

As can be seen from Equation (8), in the time domain, applying a cyclic shift c to a CAZAC sequence is equivalent to applying a cyclic shift having an amount of d subcarriers and phase rotation $Q_{k,c}$ in the frequency domain. Here, k and L are both prime each other, so c (<L) is uniquely decided according to k and d. In order to more easily understand that c is decided according to k, d and L, then c will newly be taken to be c=s(k, d, L). Table 1 shows values of c that correspond to various combinations of s(k,d,L) and k for the case in which L=11. For example, when k=1, d=1, L=11 and c=1; and when k=2, d=1, L=11 and c=6.

TABLE 1

| | s(k, d, L) when L = 11 | | |
|---|---|---|---|
| k | s(k, 1, 11) | s(k, 2, 11) | s(k, 3, 11) |
| 1 | 1 | 2 | 3 |
| 2 | 6 | 1 | 7 |
| 3 | 4 | 8 | 1 |
| 4 | 3 | 6 | 9 |
| 5 | 9 | 7 | 5 |
| 6 | 2 | 4 | 6 |
| 7 | 8 | 5 | 2 |
| 8 | 7 | 3 | 10 |

TABLE 1-continued s(k, d, L) when L = 11

| k | s(k, 1, 11) | s(k, 2, 11) | s(k, 3, 11) |
|---|---|---|---|
| 9 | 5 | 10 | 4 |
| 10 | 10 | 9 | 8 |

From the above, applying frequency offset of one subcarrier portion to the pilot 2 as shown in (A) of FIG. 2 corresponds to moving the component p11 in subcarrier 1 to subcarrier 12 after a one subcarrier cyclic shift has been added in the frequency domain as shown in (B) of FIG. 2. As a result, from Equation (8), the correlation peak position (see Equation (5)) of the pilot 2 shifts only s(k,d,L) (τ=c2+s(k,d,L)). The correlation peak position of pilot 1 (τc=c1) does not shift, so the correlation peak of pilot 2 and pilot 1 changes relatively only s(k, d=1, L=11), and on the receiving side it is not possible to restore the pilot correctly, thus as a result it becomes impossible to perform channel estimation.

To obtain the conventional correlation peak position, the amount of cyclic shift can be changed from c2 to (c$_2$−s(k,d,L). In other words, as shown in (A) of FIG. 3, by applying both a d-subcarriers frequency offset (d=1 in the figure), and a (c$_2$−s(k,d,L) cyclic shift, the relationship between pilot 1 and pilot 2 becomes as shown in (B) of FIG. 3. By doing as described above, the correlation peak positions of pilots 1 and 2 do not shift, and on the receiving side it is possible to correctly restore the pilots, and thus it is possible to improve the channel estimation accuracy. That is, it is possible to separate pilot 1 and pilot 2 by the correlation peak value positions (τ=c1, τ=c2) as the case where the frequency offset is not applied.

(a) First Pilot Generation Process and Channel Estimation Process

Figure 3:
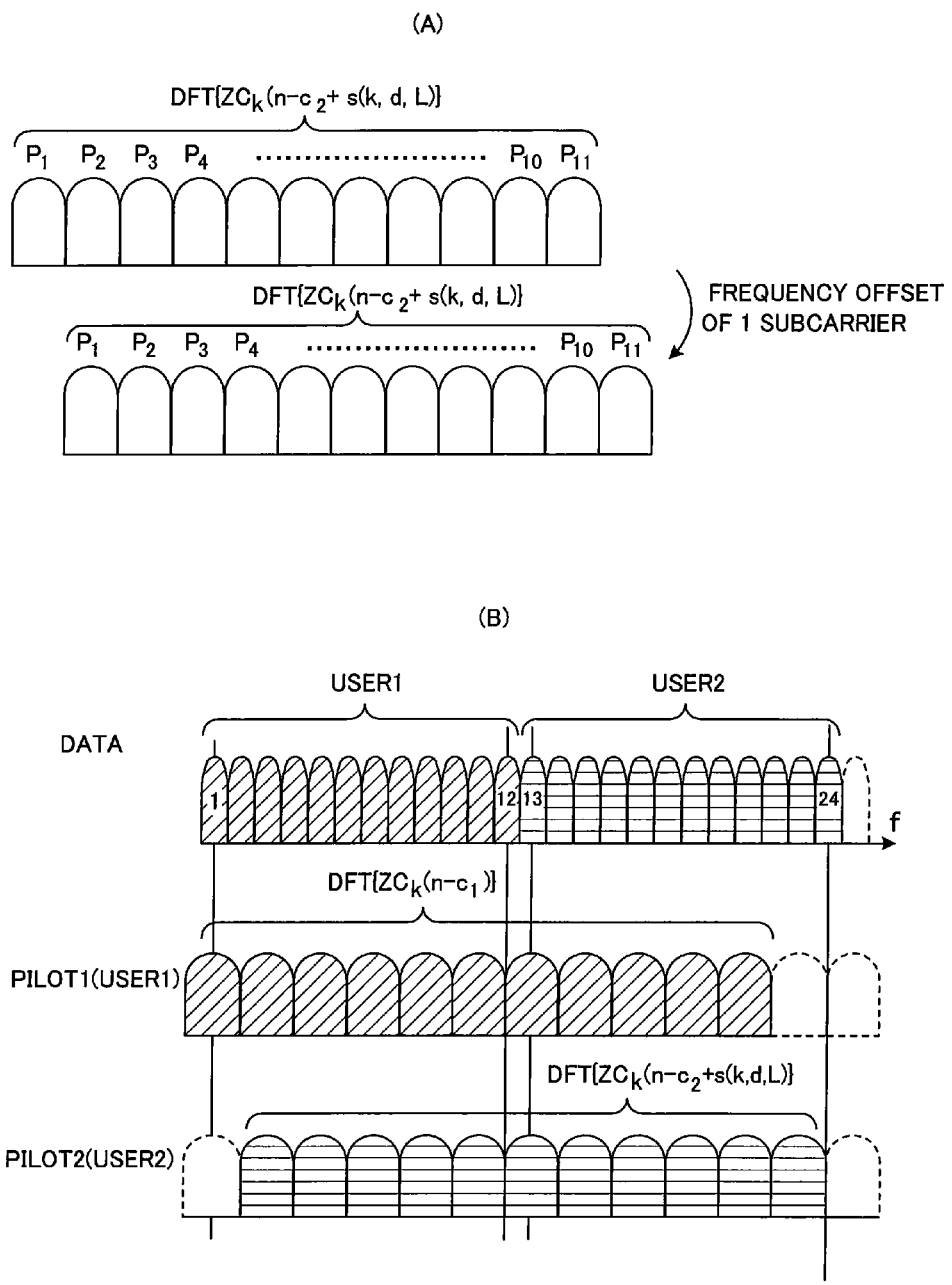
FIG. 3 is a drawing explaining a third principle of the present invention.
Figure 4:
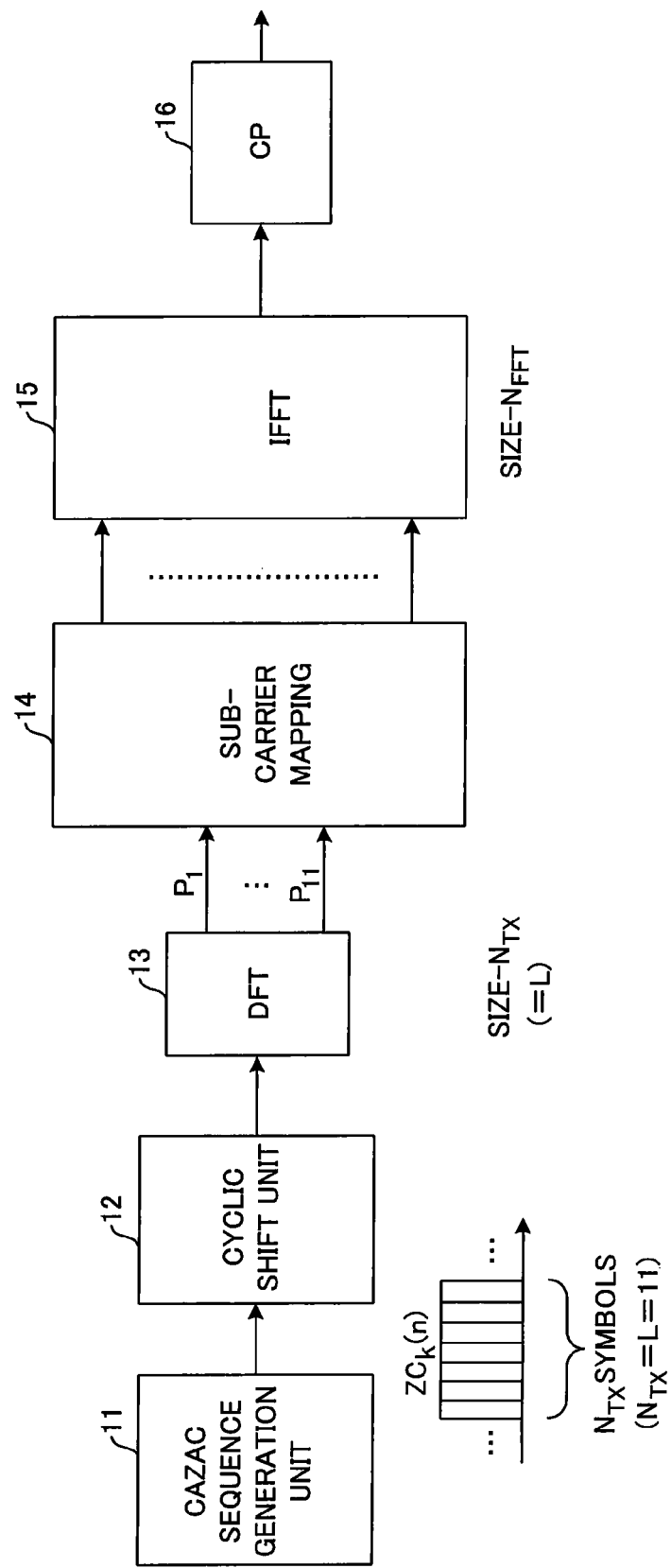
FIG. 4 is a drawing explaining a pilot generation process on the transmitting side that makes possible frequency offset of d subcarriers and a cyclic shift of ($c_2$−s(k, d, L)).

FIG. 4 is a drawing for explaining the pilot generation process on the transmission side that makes possible the d subcarrier frequency offset and (c$_2$−s(k,d,L)) cyclic shift that were explained using FIG. 3.

A CAZAC sequence generation unit 11 generates a CAZAC sequence $Zc_k(n)$ as a pilot where L=11, and a cyclic shift unit 12 cyclically shifts the CAZAC sequence $ZC_k(n)$ only c$_2$−s(k,d,L) to generate $ZC_k$(n−c2+s(k,d,L)) and inputs the result to a DFT unit 13. An $N_{TX}$ sized ($N_{TX}$=L=11) DFT unit 13 performs a DFT calculation process on $ZC_k$(n−c2+s (k,d,L)) to generate the pilot DFT {$ZC_k$(n−c2+s(k,d,L))}. A subcarrier mapping unit 14 offsets 11 pilot components p1 to p11 of the frequency domain an amount of d subcarriers (d=1 in the figure), and inputs the result to an IFFT unit 15.

Figure 5:
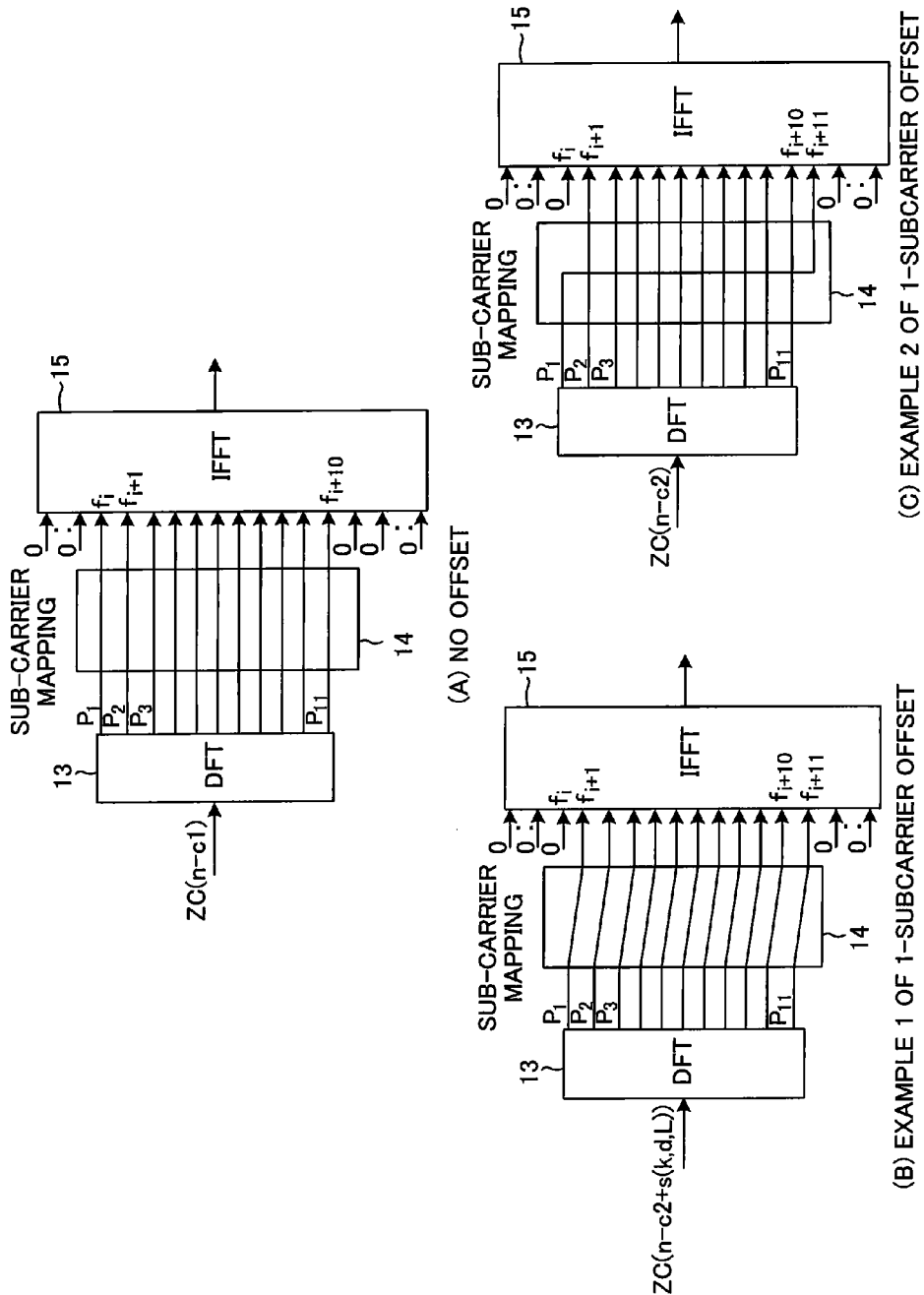
FIG. 5 is a drawing explaining offset by the subcarrier mapping unit.

FIG. 5 is a drawing explaining the offset by the subcarrier mapping unit 14, where (A) shows the case where there is no offset (d=0), and the subcarrier mapping unit 14 inputs 11 pilot components p1 to p11 to the frequency terminals $f_i$, $f_{i+1}$, $f_{i+2}$, ... $f_{i+10}$ of the IFFT unit 15, and inputs 0 to the other terminals. In the figure, (B) shows the case where there is offset (d=1), and the subcarrier mapping unit 14 inputs 11 pilot components p1 to p11 to the frequency terminals $f_{i+1}$, $f_{i+2}$, $f_{i+3}$ ..., $f_{i+11}$, and inputs 0 to the other terminals. An $N_{FFT}$ sized (for example $N_{FFT}$=128) IFFT unit 15 performs IDFT calculation processing on the input subcarrier components to convert the signal to a time-domain signal, and a CP (Cyclic Prefix) insertion unit 16 adds a cyclic prefix for preventing interference and outputs the result. In FIG. 5, (C) shows another example of the case of when there is offset (d=1). In this case, the cyclic shift unit 12 cyclically shifts the CAZAC sequence $ZC_k$(n) only c$_2$ to generate $ZC_k$(n−c2) and inputs the result to the DFT unit 13. The DFT unit 13 performs DFT calculation processing on $ZC_k$(n−c2) to generate a pilot DFT {$ZC_k$(n−c2)}. The subcarrier mapping unit 14 inputs pilot components p2 to p11 to the terminals $f_i$, $f_{i+1}$, $f_{i+2}$, ..., $f_{i+10}$ of the IFFT unit 15, and inputs pilot component p1 to the terminal $f_{i+11}$ of the IFFT unit 15.

Figure 6:
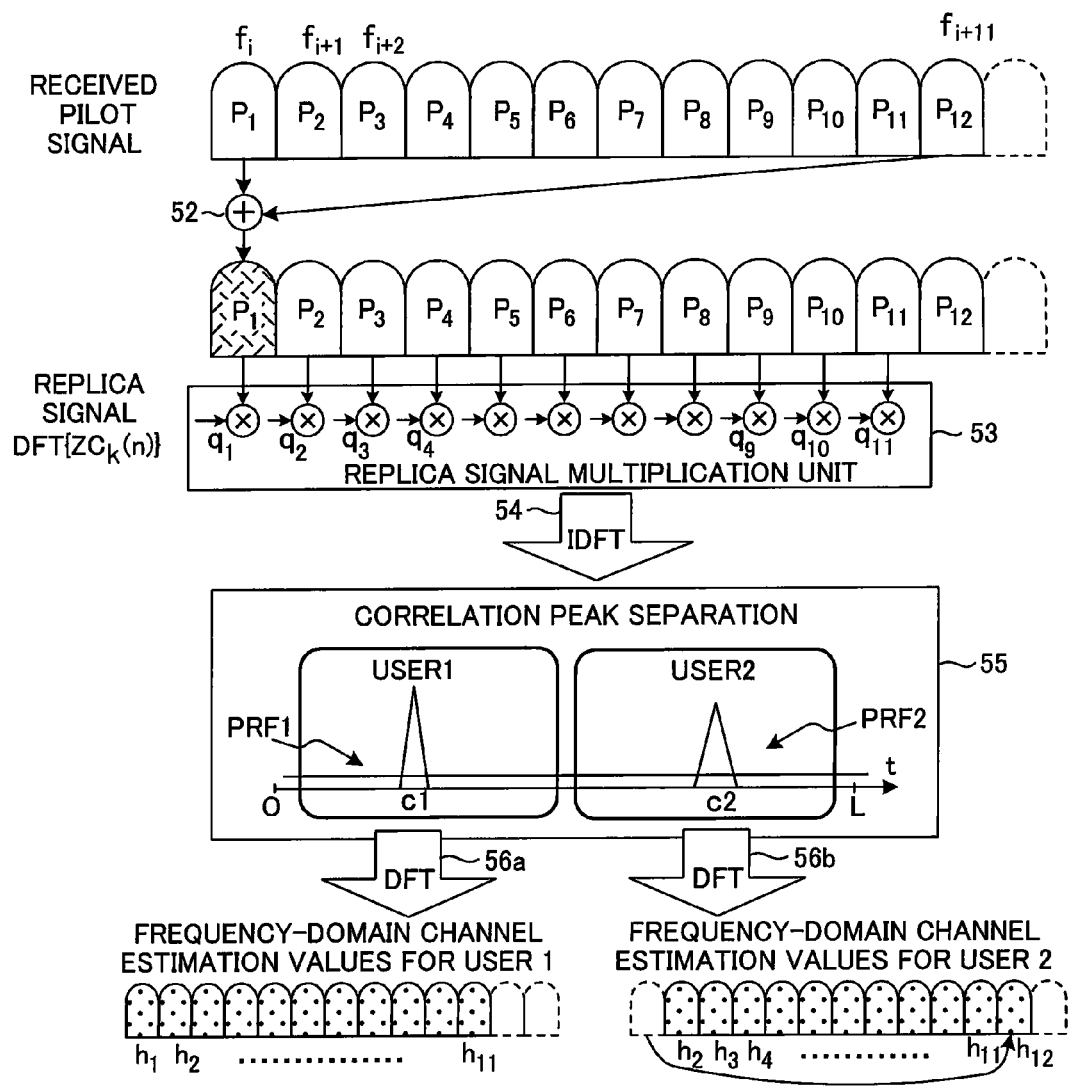
FIG. 6 is a drawing explaining the channel estimation process on the receiving side.

FIG. 6 is a drawing explaining the channel estimation process on the receiving side.

A pilot 1 and pilot 2 that are respectively transmitted from a user 1 and user 2 (see FIG. 3) are multiplexed in air to become the subcarrier components (p1 to p12) of the subcarrier frequencies $f_i$, $f_{i+1}$, $f_{i+2}$, $f_{i+3}$, ..., $f_{i+11}$ and input to the channel estimation unit. A subcarrier addition unit 52 adds the subcarrier components p12 and p1 that do not overlap each other, and takes the added result to be the new subcarrier component p1 of subcarrier frequency f1.

A replica signal multiplication unit 53 multiplies a replica signal of a pilot qi and received pilot signal pi for each subcarrier, an IDFT unit 54 performs an IDFT calculation processing on the replica multiplication results and outputs a delay profile in the time domain. The replica signal of the pilot is obtained by performing DFT calculation processing on a known CAZAC sequence $ZC_k$(n) for a cyclic shift of zero.

The time-domain delay profile has a length of L samples with correlation peaks at t=c1, t=c2, so a profile extraction unit 55 separates out the correlation peaks by t=(c1+c2)/2, to generate profiles PRF1, PRF2 having a length of L/2 samples for user 1 and user 2. An L sized DFT unit 56a inserts L/4 number of zeros on both sides of the L/2 long profile PRF1 to make the length L, and performs DFT calculation. By doing so, the channel estimation values h1 to h11 for user 1 are obtained from the DFT unit 56a at the subcarrier frequencies $f_i$, $f_{i+1}$, $f_{i+2}$, $f_{i+3}$, ..., $f_{i+10}$. Similarly, an L sized DFT unit 56b inserts L/4 number of zeros on both sides of the L/2 sample length profile PRF2 to make the length L, and performs DFT calculation. By doing so, the channel estimation values h2 to h12 for user 2 are obtained from the DFT unit 56b at the subcarrier frequencies $f_{i+1}$, $f_{i+2}$, $f_{i+3}$, ..., $f_{i+11}$. However, since the subcarrier adding unit 52 adds p1 and p12 to become the subcarrier component of the subcarrier frequency $f_i$, the channel estimation value of the subcarrier frequency $f_i$ that is output from the DFT unit 56b is taken to be the channel estimation value h12 of the subcarrier frequency $f_{i+11}$.

From the above, as long as the distortion due to the propagation conditions is small, it is possible to separate pilot 1 and pilot 2 in a completely orthogonal form in a time-domain delay profile after the components that do not overlap each other on the receiving side have been added and multiplied by a replica as shown in FIG. 6. When the distortion due to the propagation conditions is large, it is possible to omit the subcarrier addition, and separate pilot 1 and pilot 2 in a time-domain delay profile after direct replica multiplication.

(b) Second Pilot Generation Process and Channel Estimation Process

In the first channel estimation process described above, subcarrier components p12 and p1 that do not overlap each other are added together and the added result is taken to be the component of subcarrier frequency $f_i$. However, when the subcarrier component for subcarrier frequency $f_i$ of the received signal is already the value obtained by adding p12 and p1, it is not necessary to add subcarriers on the receiving side.

Figure 7:
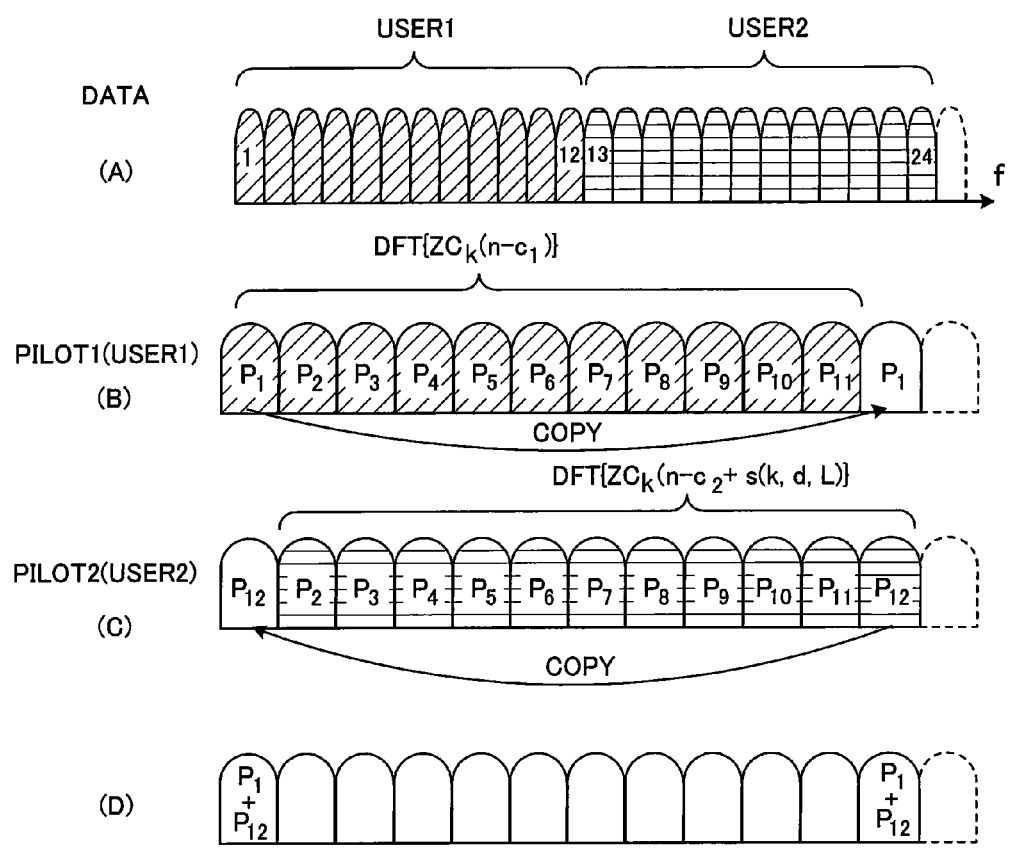
FIG. 7 is a drawing explaining a second pilot generation process.

FIG. 7 is a drawing explaining a second pilot generation process, where (A) shows the data subcarriers for a user 1 and user 2.

As shown in (B) of FIG. 7, the transmitting side (user 1) copies the subcarrier component p1 of the subcarrier frequency $f_i$ of pilot 1 so that it becomes the subcarrier component of subcarrier frequency $f_{i+11}$ and performs transmission, and as shown in (C) of FIG. 7, user 2 copies the subcarrier component p12 of subcarrier frequency $f_{i+11}$ of pilot 2 so that it becomes the subcarrier component of subcarrier frequency $f_i$, and performs transmission. By doing so, as shown in (D) of FIG. 7, these pilots are multiplexed in air and received by the receiving side, and the subcarrier component of the subcarrier frequency $f_i$ becomes the sum of p1 and p2, so there is no need to add subcarriers on the receiving side.

Figure 8:
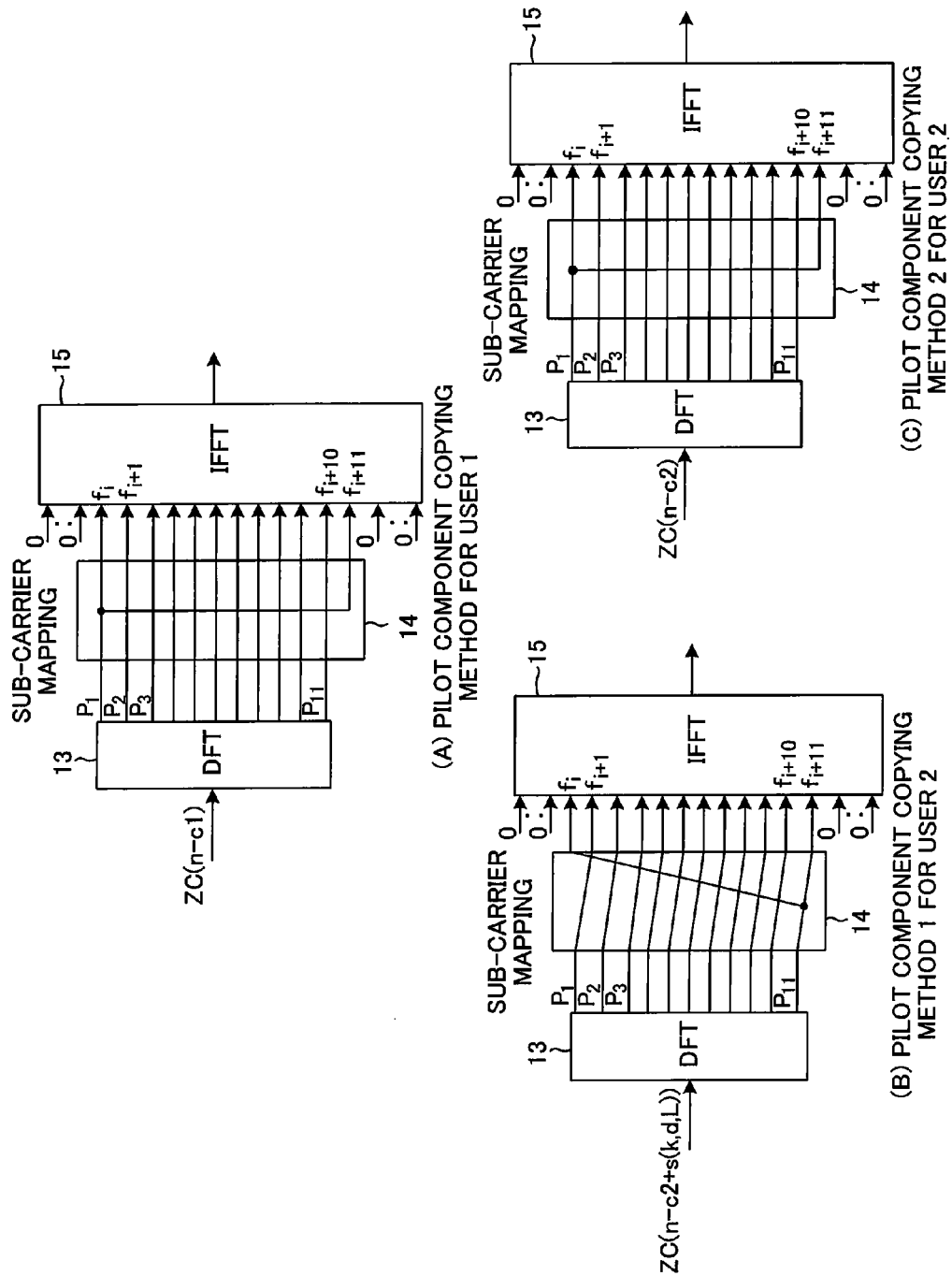
FIG. 8 is a drawing explaining a copying method on the transmitter.

FIG. 8 is a drawing explaining the copying method on the transmitting side, where (A) is the copying method for pilot 1 by user 1, and in this method, the subcarrier mapping unit 14 inputs the subcarrier component p1 of the subcarrier frequency $f_i$ of pilot 1 to the terminal of frequency $f_{i+11}$ of the IFFT unit 15 as well so that it is also the subcarrier component of the subcarrier frequency $f_{i+11}$. In the figure, (B) is the copying method for pilot 2 by user 2, and in this method, the subcarrier mapping unit 14 inputs the subcarrier component p12 of the subcarrier frequency $f_{i+11}$ of pilot 12 to the terminal of frequency $f_i$ of the IFFT unit 15 as well so that it is also the subcarrier component of the subcarrier frequency $f_i$. In the figure, (C) is an example of implementing the copying method for pilot 2 by user 2, and corresponds to (C) of FIG. 5.

Figure 9:
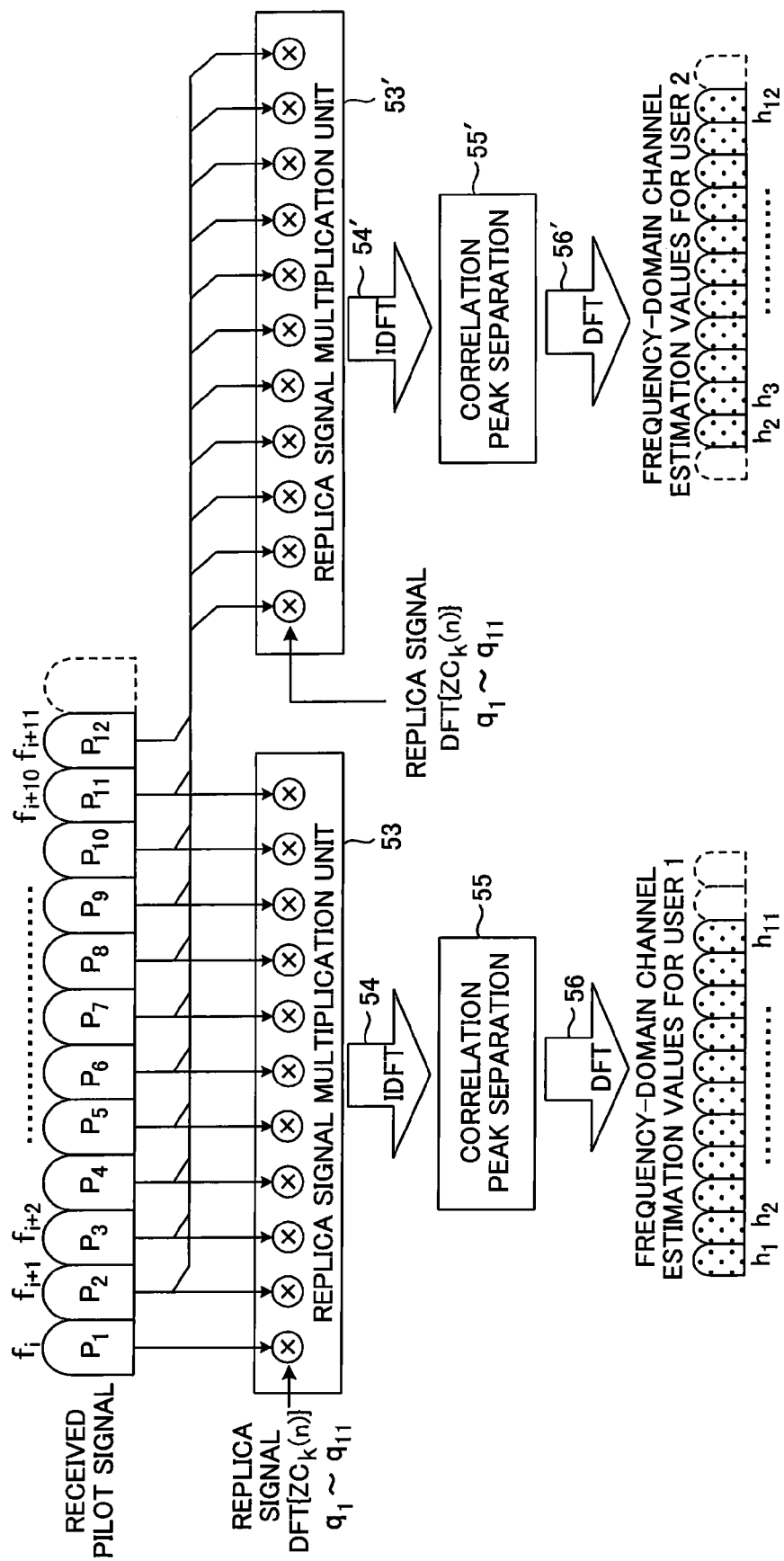
FIG. 9 is a drawing explaining a second channel estimation process on the receiving side.

FIG. 9 is a drawing explaining the channel estimation process by the receiving side. Pilot 1 and pilot 2 (see (B) and (C) of FIG. 7) that are respectively transmitted from user 1 and user 2 are multiplexed in air to become the subcarrier components (p1 to p12) of the subcarrier frequencies $f_i$, $f_{i+1}$, $f_{i+2}$, $f_{i+3}$, ..., $f_{i+11}$ and input to the channel estimation unit (see (D) of FIG. 7).

The replica signal multiplication unit 53 for user 1 multiplies the replica signals qi (q1 to q11) of the pilot by the received pilot signals pi (p1 to p11) for each subcarrier, and after that, the IDFT unit 54, correlation separation unit 55, and DFT unit 56 perform processing in the same way as shown in FIG. 6 to generate channel estimation values h1 to h11 for user 1.

On the other hand, the replica signal multiplication unit 53' for user 2 multiplies the replica signals qi (q1 to q11) of the pilot with the received pilot signals pi (p2 to p12) for each subcarrier, and after that, the IDFT unit 54', correlation separation unit 55' and DFT unit 56' perform the same processing as was performed for user 1 to generate channel estimation values h2 to h12 for user 2.

(c) Third Pilot Generation Process and Channel Estimation Process

Figure 10:
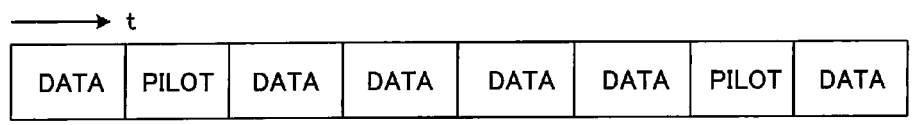
FIG. 10 is a drawing that shows frame configuration.
Figure 11:
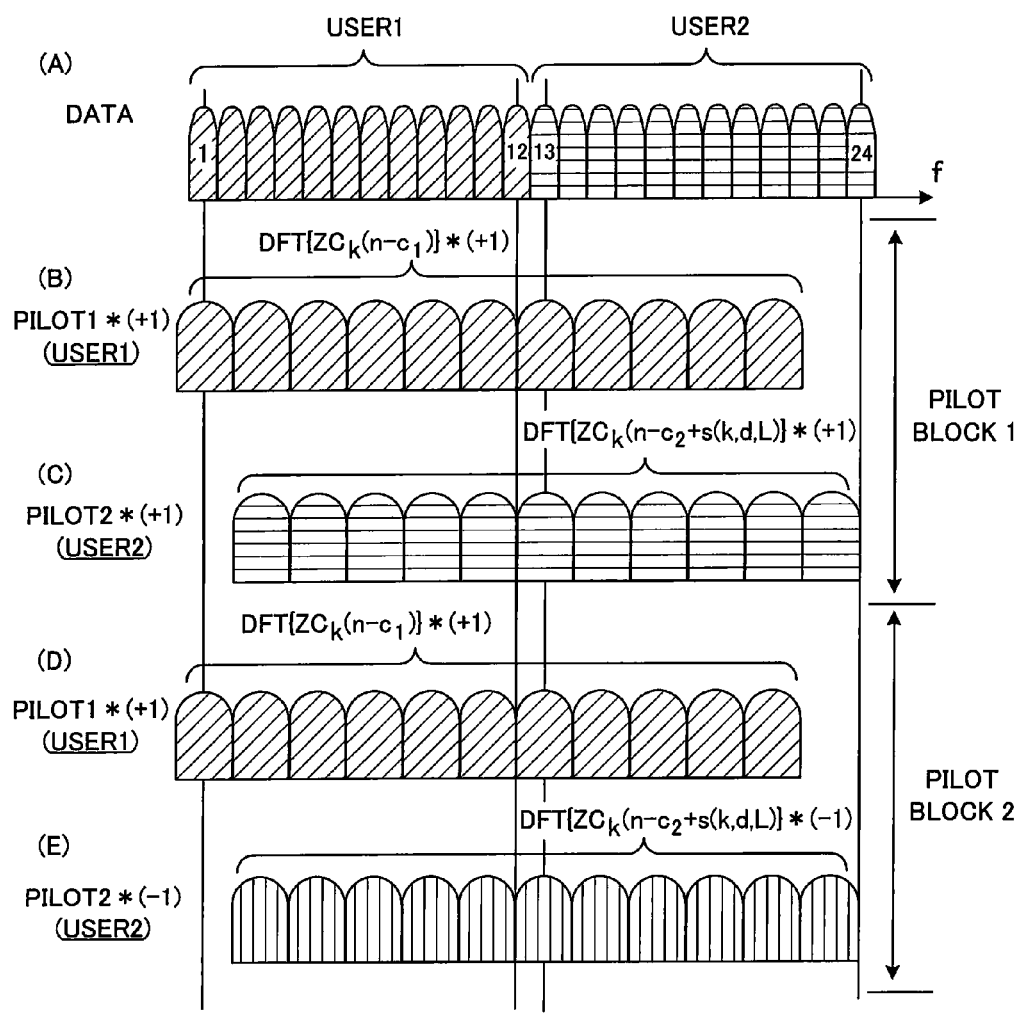
FIG. 11 is a drawing explaining a pilot separation method.

In the first channel estimation process described above, the correlation separation unit 55 separates the pilot components for user 1 and the pilot components for user 2, however, as shown in FIG. 10, when two pilot blocks are included in one frame, for example, they can be separated as explained below. FIG. 11 is a drawing explaining the pilot separation method, where (A) shows the data subcarriers for user 1 and user 2.

As shown in (B) and (C) of FIG. 11, each of the subcarrier components of the first pilot 1 (=DFT $\{ZC_k(n-c1)\}$) and pilot 2 (=DFT $\{ZC_k(n-c2+s(k,d,L))\}$), of user 1 and user 2 are multiplied by +1 and transmitted, then as shown in (D) and (E), and each of the subcarrier components of the next pilot 1 and pilot 2 are multiplied by +1 and −1, respectively and transmitted.

By doing this, the receiving side first receives the following multiplexed pilot signal $$\text{DFT}\{ZC_k(n-c1)\}\times(+1)+\text{DFT}\{ZC_k(n-c2+s(k,d,L))\}\times(+1),$$

then next receives the multiplexed pilot signal $$\text{DFT}\{ZC_k(n-c1)\}\times(+1)+\text{DFT}\{ZC_k(n-c2+s(k,d,L))\}\times(-1).$$

Therefore, in order for the receiving side to generate the pilots for user 1, the next multiplexed pilot signal can be added to the first multiplexed pilot signal. In other words, the polarities of pilots 2 are different, so by adding the signals, pilots 2 are negated, and only pilot 1 remains. Moreover, in order for the receiving side to generate the pilots for user 2, the next multiplexed pilot signal can be subtracted from the first multiplexed pilot signal. In other words, the polarities of pilots 1 are the same, so by subtracting the signals, pilots 1 are negated and only pilot 2 remains.

Figure 12:
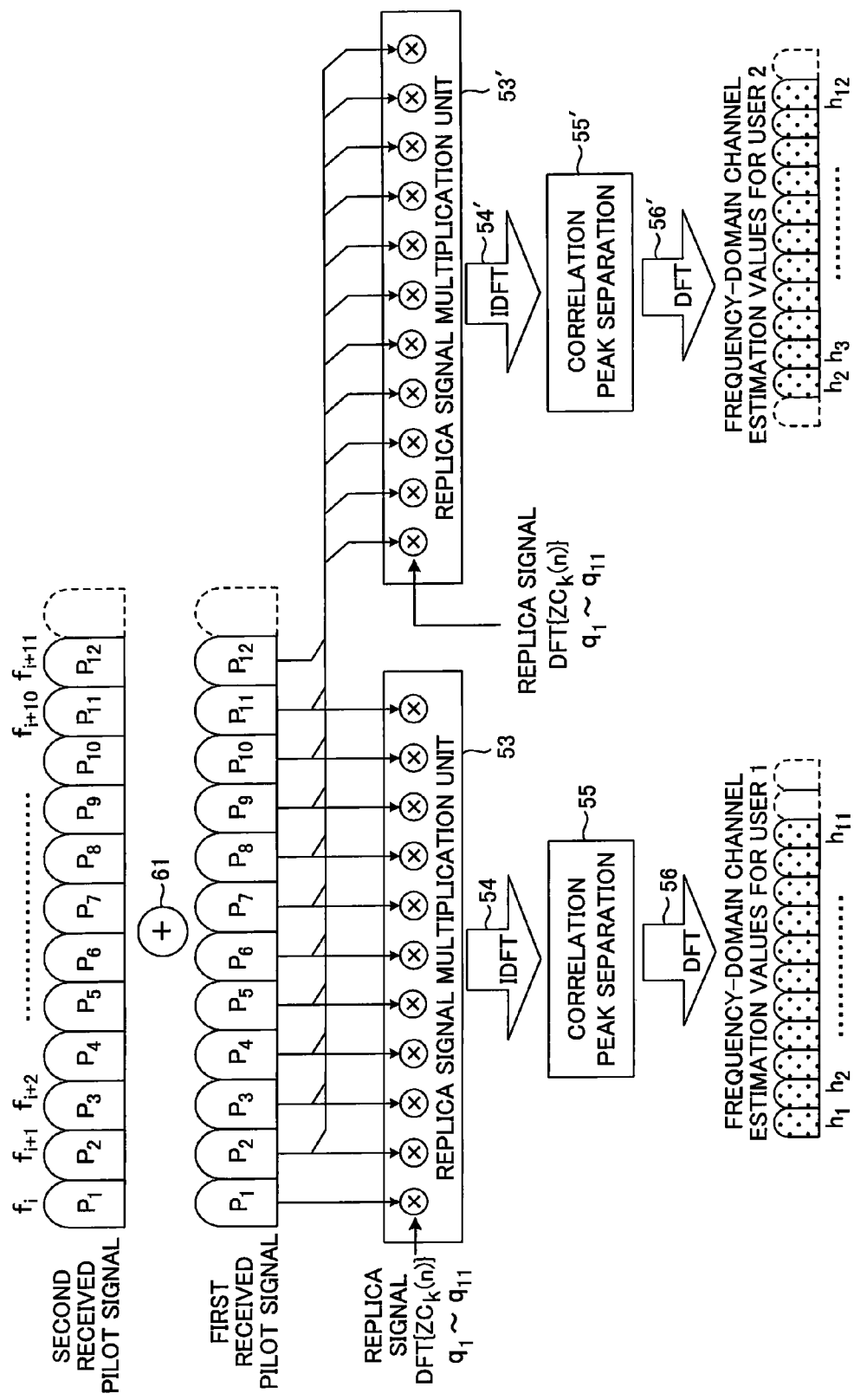
FIG. 12 is a drawing explaining a third channel estimation process on the receiving side.

FIG. 12 is a drawing explaining the channel estimation process on the receiving side. Pilot 1 and pilot 2 that are transmitted from user 1 and user 2, respectively (see (B), (C), (D) and (E) of FIG. 11) are multiplexed in air to becomes the subcarrier components (p1 to p12) of the subcarrier frequencies $f_i$, $f_{i+1}$, $f_{i+2}$, $f_{i+3}$, ..., $f_{i+11}$ and input to the channel estimation unit.

An inter-block subcarrier addition unit 61 receives and saves the first received pilot signal. Then, when generating the pilots for user 1, the inter-block subcarrier addition unit 61, after receiving the second received pilot signal, adds the first and second received pilot signals for each subcarrier to generate the subcarrier components p1 to p11 for the subcarrier frequencies $f_i$, $f_{i+1}$, $f_{i+2}$, $f_{i+3}$, ..., $f_{i+10}$ of pilot 1. The replica signal multiplication unit 53 for user 1 multiplies the replica signals qi (q1 to q11) of the pilot by the received pilot signals pi (p1 to p11) for each subcarrier, and after that, the IDFT unit 54, correlation separation unit 55 and DFT unit 56 perform the same processing as shown in FIG. 6 to generate the channel estimation values h1 to h11 for user 1.

On the other hand, when generating the pilots for user 2, the inter-block subcarrier addition unit 61 subtracts the first and second pilot signals for each subcarrier, to generate the subcarrier components P2 to p12 of the subcarrier frequencies $f_{i+1}$, $f_{i+2}$, $f_{i+3}$, ..., $f_{i+11}$ of pilot 2. The replica signal multiplication unit 53' for user 2 multiplies the replica signals qi (q1 to q11) of the pilot by the received pilot signals pi (p2 to p12) for each subcarrier, and after that, the IDFT unit 54', correlation separation unit 55' and DFT unit 56' perform the same processing as was performed for user 1 to generate the channel estimation values h2 to h12 for user 2.

The case in which the number of pilot blocks is two was explained above, however, this third pilot generation process and channel estimation process can also be applied in the case in which there is an even number of pilot blocks. In that case, the base station instructs a certain user terminal to multiply the pilot signals of all of the blocks by +1, and instructs other user terminals to multiply half of the pilot signals by +1 and to multiply the remaining half of the pilot signals by −1. Also, when the base station receives multiplexed pilot signals that have been transmitted from each of the user terminals, the base station performs an addition or subtraction calculation process on the pilot signals for all of the blocks so that only the pilot signal from a specified user terminal (user terminal 1 or 2) remains, then multiplies the calculation result by the replica of the pilot signal, converts the replica multiplication result to a time-domain signal, after which it separates out the signal portion of the user terminal from that time-domain signal and performs channel estimation.

(B) Mobile Station

Figure 13:
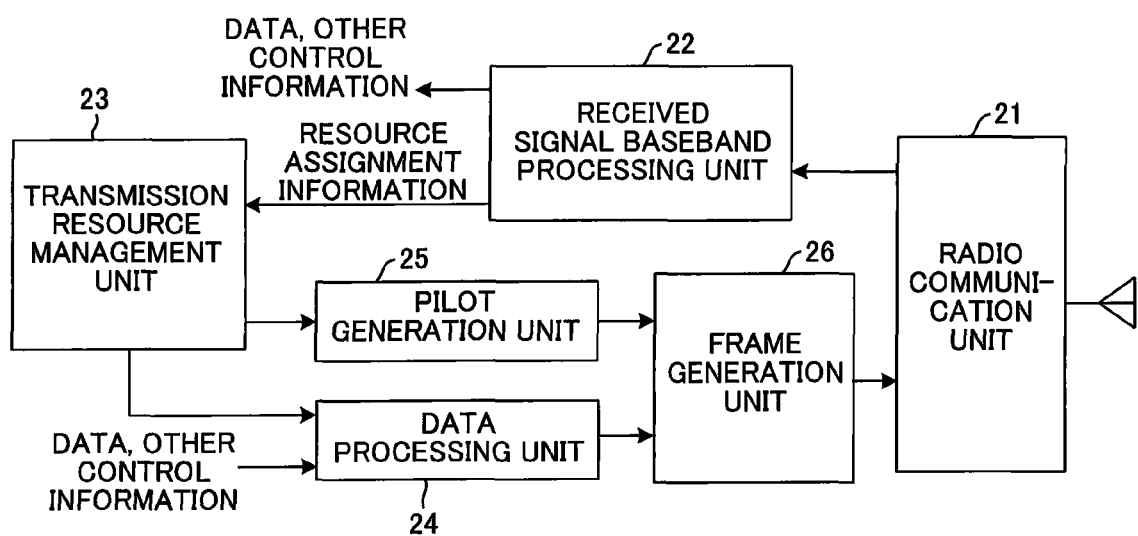
FIG. 13 is a drawing of the construction of a mobile station.

FIG. 13 is a drawing showing the construction of a mobile station.

In the case in which uplink transmission data is generated, the mobile station (user terminal) sends a request to the base station to assign resources, and according to that request the base station assigns resources based on the condition of the propagation path of the mobile station and notifies the mobile station of the resource assignment information. A radio communication unit 21 of the mobile station converts a radio signal that is received from the base station to a baseband signal and inputs the baseband signal to a baseband processing unit 22. The baseband processing unit 22 separates out the data and other control information from that received signal, as well as separates out the resource assignment information and inputs that resource assignment information to a transmission resource management unit 23. In addition to the transmission frequency band, timing, modulation method and the like of the data, the resource assignment information includes the transmission frequency band of the pilot, the sequence number k and sequence length L of the CAZAC sequence that is used as the pilot, the amount of cyclic shift, the amount of frequency offset d, etc.

The transmission resource management unit 23 inputs the information necessary for transmission of control information to a data processing unit 24, and inputs the information necessary for generating and transmitting a pilot to a pilot generation unit 25. Based on the input information, the data processing unit 24 performs data modulation and single-carrier transmission processing on the data and control information and outputs the result, and according to an instruction from the transmission resource management unit 23, the pilot generation unit 25 performs processing such as the generation of a CAZAC sequence, cyclic shift, frequency offset and the like to generate a pilot, after which a frame generation unit 26, as shown in FIG. 10 for example, performs time-division multiplexing of six data blocks and two pilot blocks to generate a frame, and the radio communication unit 21 transmits that frame to the base station.

Figure 14:
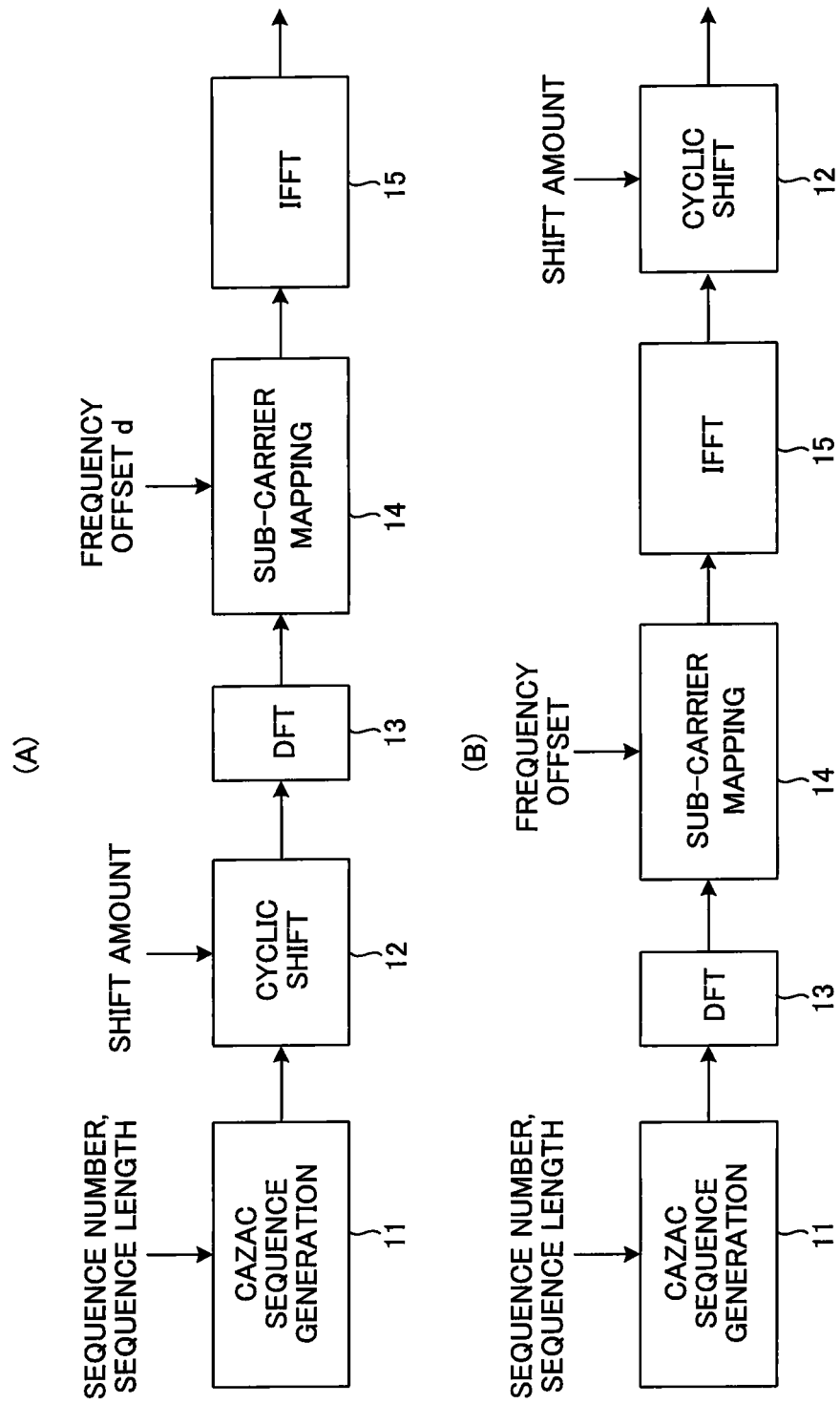
FIG. 14 is a drawing of the construction of a pilot generation unit.

FIG. 14 is a drawing showing the construction of the pilot generation unit 25, and shows the construction in the case where pilots are generated according to the first pilot generation process explained using FIG. 3, where (A) shows the case in which a cyclic shift is performed before DFT, and (B) shows the case in which a cyclic shift is performed after IFFT.

In (A) of FIG. 14, the transmission resource management unit 23 inputs the parameters (CAZAC sequence number, sequence length, amount of cyclic shift, and frequency offset) that are included in the resource assignment information received from the base station and that are necessary for generating and transmitting pilots to the respective units.

The CAZAC sequence generation unit 11 generates a CAZAC sequence $ZC_k(n)$ having the instructed sequence length L and sequence number k as a pilot, and the cyclic shift unit 12 performs a cyclic shift of the CAZAC sequence $ZC_k(n)$ by the instructed c sample amount and inputs the obtained sequence $ZC_k(n-c)$ to the DFT unit 13. For example, for pilot 1 shown in (B) of FIG. 3, the cyclic shift unit 12 shifts $ZC_k(n)$ by just the amount c1 to generate $ZC_k(n-c1)$, and for pilot 2, shifts $ZC_k(n)$ by just the amount c2-s(k,d,L) to generate $ZC_k(n-c2+s(k,d,L))$ and inputs the results to the DFT unit 13. The $N_{TX}$ sized ($N_{TX}=L$) DFT unit 13 performs DFT processing on the input pilot $ZC_k(n-c)$ to generate a frequency-domain pilot $DFT\{ZC_k(n-c)\}$. Based on the instructed amount of frequency offset, the subcarrier mapping unit 14 controls the mapping position of the pilot and performs frequency offset, and the $N_{FFT}$ sized ($N_{FFT}=128$) IFFT unit 15 performs IFFT processing on the input subcarrier components and converts the signal to a time-domain signal, then inputs that signal to the frame generation unit 26.

In FIG. 14, (B) shows the construction of a pilot generation unit 25 for the case in which cyclic shift is performed after IFFT, where by performing cyclic shift an amount of $c \times N_{FFT}/N_{TX}$ samples, the cyclic shift unit 12 is able to obtain the same result as in the case shown in (A) of FIG. 14.

(C) Base Station

Figure 15:
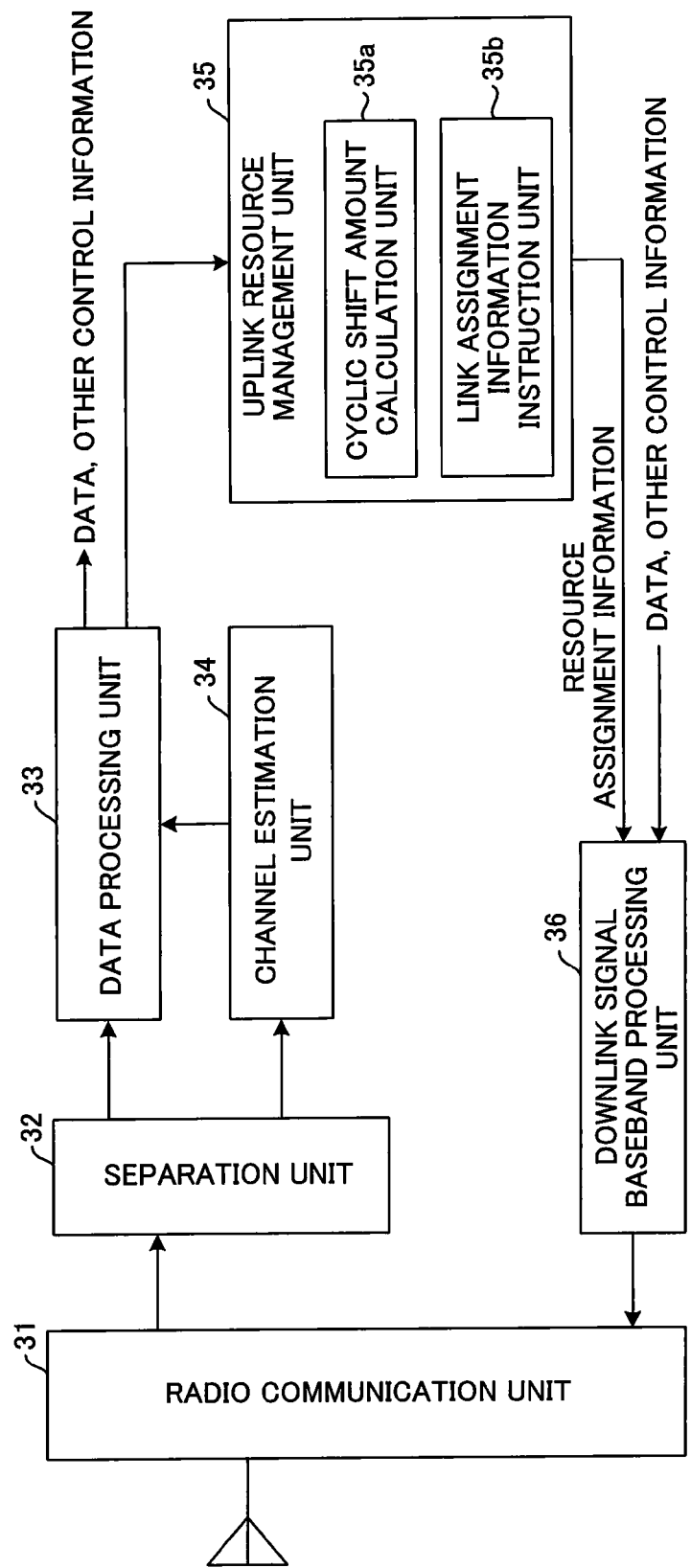
FIG. 15 is a drawing of the construction of a base station.

FIG. 15 is a drawing showing the construction of a base station.

When uplink transmission data is generated, a mobile station (user terminal) executes a procedure for establishing a communication link with the base station, and in this procedure transmits the condition of the propagation path to the base station. In other words, the mobile station receives a common pilot that was transmitted from the base station and performs radio measurement (SIR or SNR measurement), then reports the results of that radio measurement to the base station as the condition of the propagation path. For example, the base station divides the transmission band into a plurality of transmission frequency bands, and transmits common pilots for each transmission frequency band, then the mobile station performs radio measurement for each transmission frequency band and sends the measurement result to the base station. After receiving a resource assignment request, together with obtaining the condition of the propagation path from the mobile station, the base station assigns resources based on the propagation path condition from the mobile station, and sends resource assignment information to the mobile station.

Figure 24:
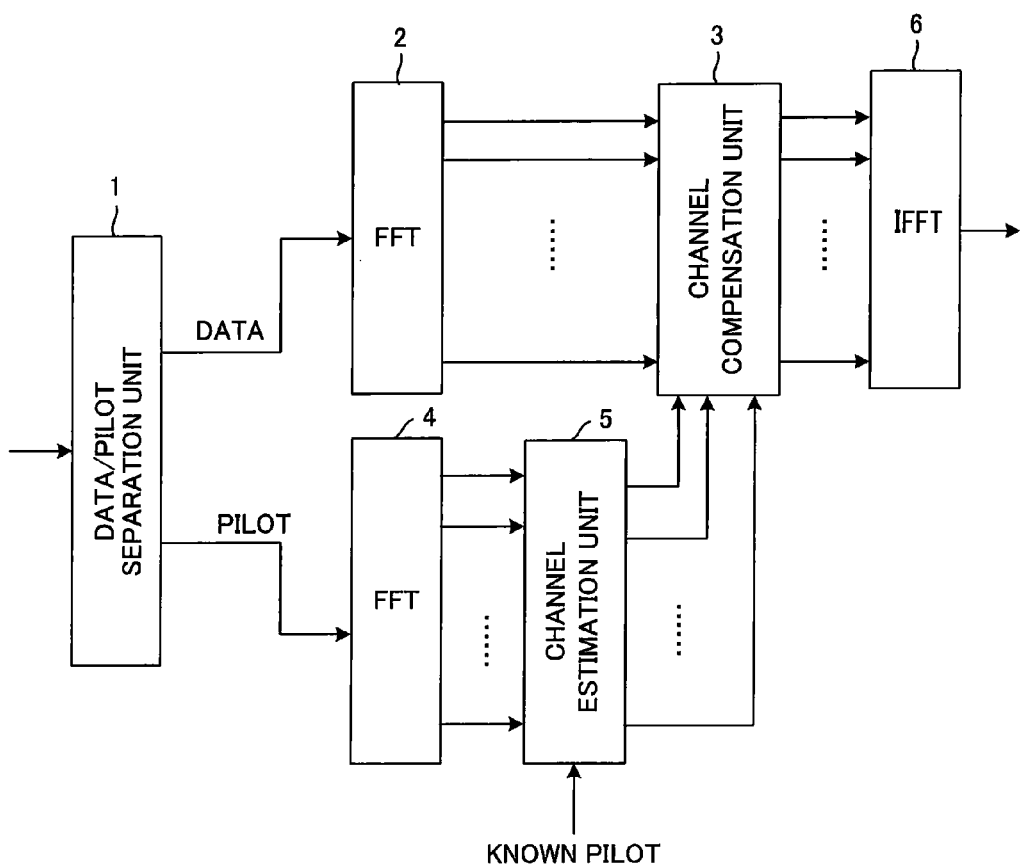
FIG. 24 is a drawing for explaining frequency equalization.
Figure 25:
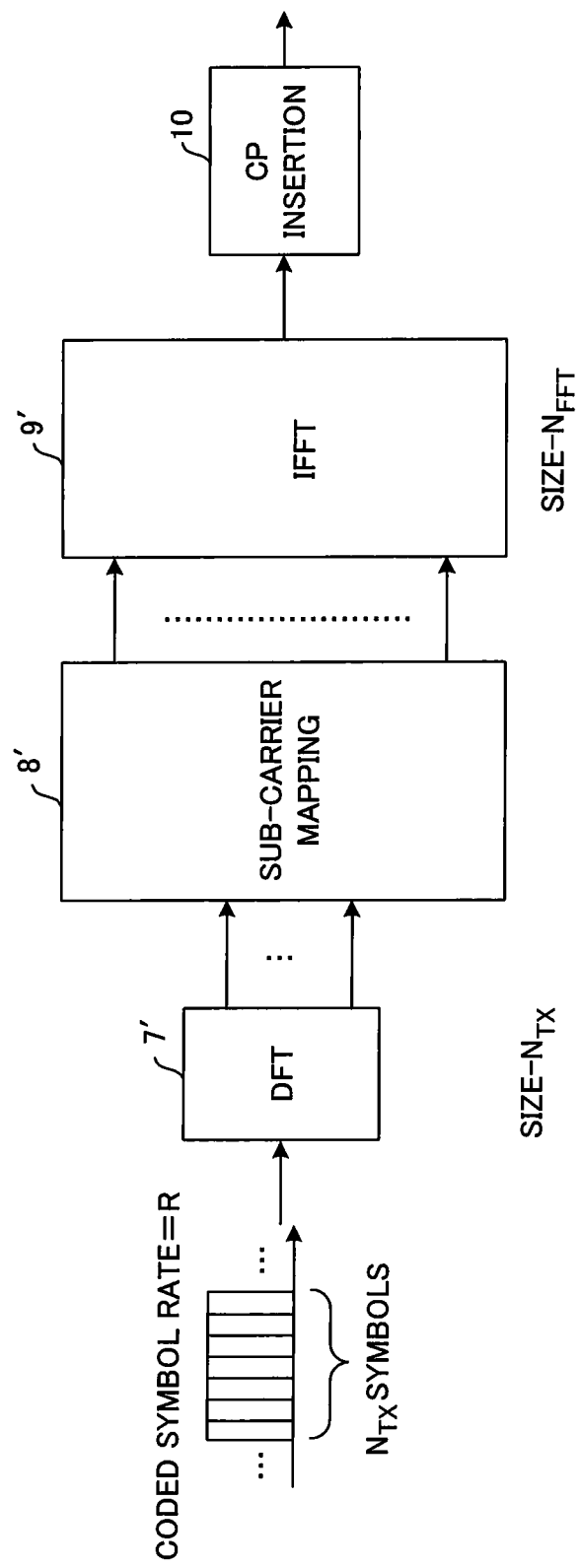
FIG. 25 is a drawing of construction of a SC-FDMA transmission unit.
Figure 26:
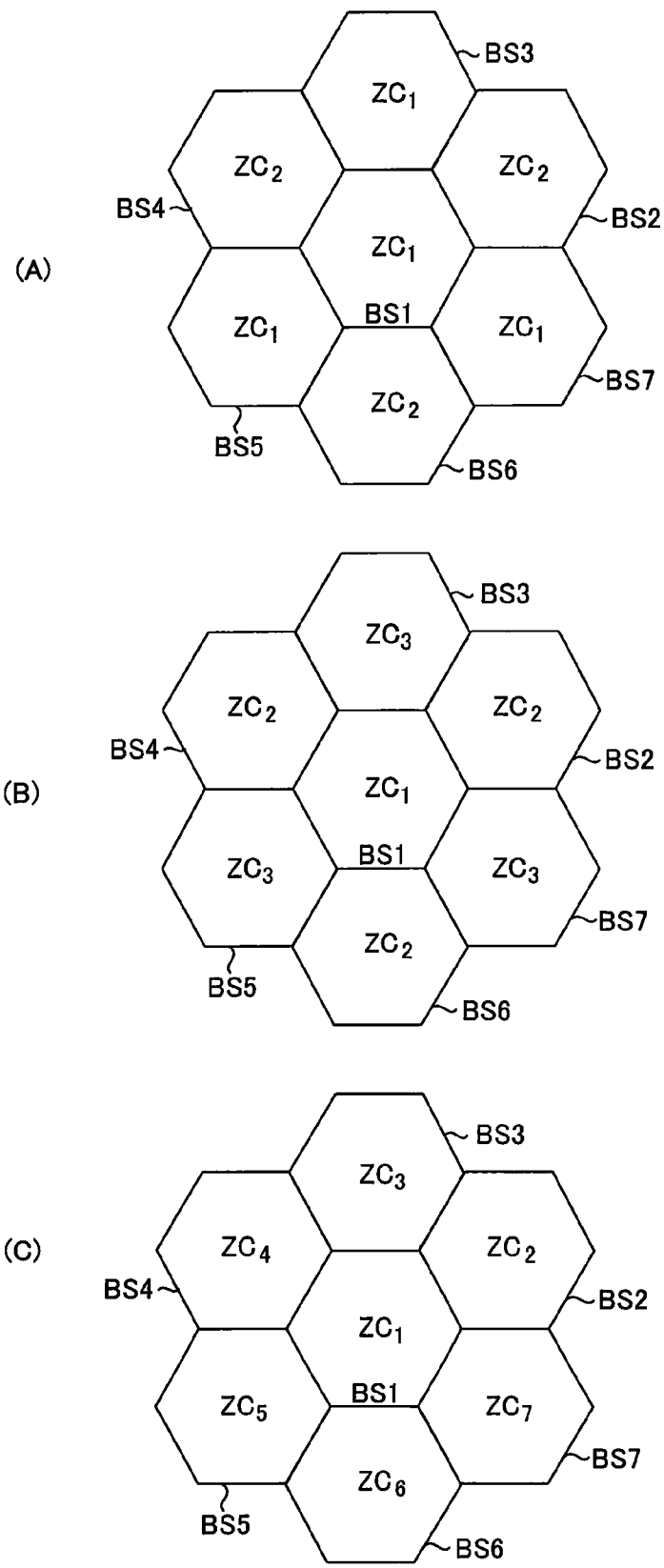
FIG. 26 is a drawing explaining inter-cell interference.

The radio communication unit 31 converts a radio signal that is received from the mobile station to a baseband signal, a separation unit 32 separates out the data/control information and the pilots, then inputs the data/control information to the data processing unit 33, and inputs the pilots to the channel estimation unit 34. The data processing unit 33 and channel estimation unit 34 comprise the frequency equalization construction shown in FIG. 24.

The data processing unit 33 demodulates the propagation path condition information that was transmitted from the mobile station at the time the communication link was established, and inputs that information to the uplink resource management unit 35. The uplink resource management unit 35 assigns resources based on the propagation path condition, then creates resource assignment information and inputs that information to the downlink signal baseband processing unit 36. In addition to the transmission frequency band, timing, modulation method and the like of the data, the resource assignment information includes the sequence number k and sequence length L of the CAZAC sequence that is used as a pilot, the amount of cyclic shift, the amount of frequency offset d, etc. The downlink signal baseband processing unit 36 performs time-division multiplexing of the data, control information and resource assignment information, and transmits the resulting signal from the radio communication unit 31.

After receiving the resource assignment information, the mobile station performs processing as explained in FIG. 13 and FIG. 14, and transmits a frame comprising data and pilots.

The channel estimation unit 34 uses the pilots that were separated out and input by the separation unit 32 to perform a first channel estimation process as was explained using FIG. 6, then inputs the channel estimation values to the data processing unit 33. The data processing unit 33 performs channel compensation based on the channel estimation values, and based on the channel compensation results, demodulates the data. The uplink resource management unit 35 comprises a cyclic shift amount calculation unit 35a and a link assignment information instruction unit 35b.

Figure 16:
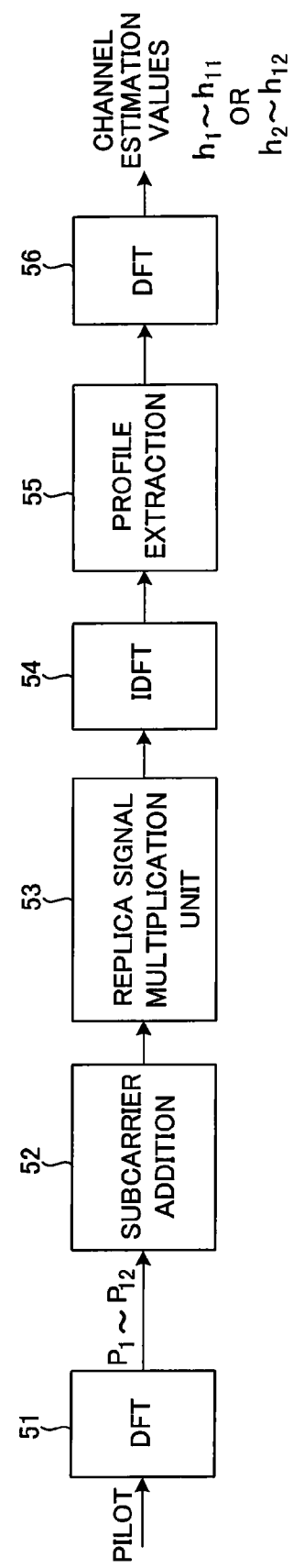
FIG. 16 is a drawing of the construction of a channel estimation unit.

FIG. 16 is a drawing showing the construction of the channel estimation unit 34, where the same reference numbers are given to parts that are the same as those shown in FIG. 6.

The DFT unit 51 performs DFT processing on a pilot signal that is input from the separation unit and converts the signal to a frequency-domain pilot signal (subcarrier components p1 to p12). The subcarrier addition unit 52 adds subcarrier components p12 and p1 that do not overlap each other, and designates the addition result as the new subcarrier component p1 of subcarrier frequency f1.

The replica signal multiplication unit 53 multiplies the replica signals qi of the pilot with the received pilot signals pi for each subcarrier, and the IDFT unit 54 performs IDFT processing on the replica multiplication result to output a time-domain pilot signal. The profile extraction unit 55 separates out the IDFT output signal at t=(c1+c2)/2, and when the signal is a signal received from user 1, selects profile PRF1 (see FIG. 6), then the DFT unit 56 performs DFT processing on that profile PRF1 and outputs channel estimation values h1 to h11. On the other hand, when the signal is a signal received from user 2, the profile extraction unit 55 selects profile PRF2, then the DFT unit 56 performs DFT processing on that profile PRF2 and outputs channel estimation values h2 to h12.

Figure 17:
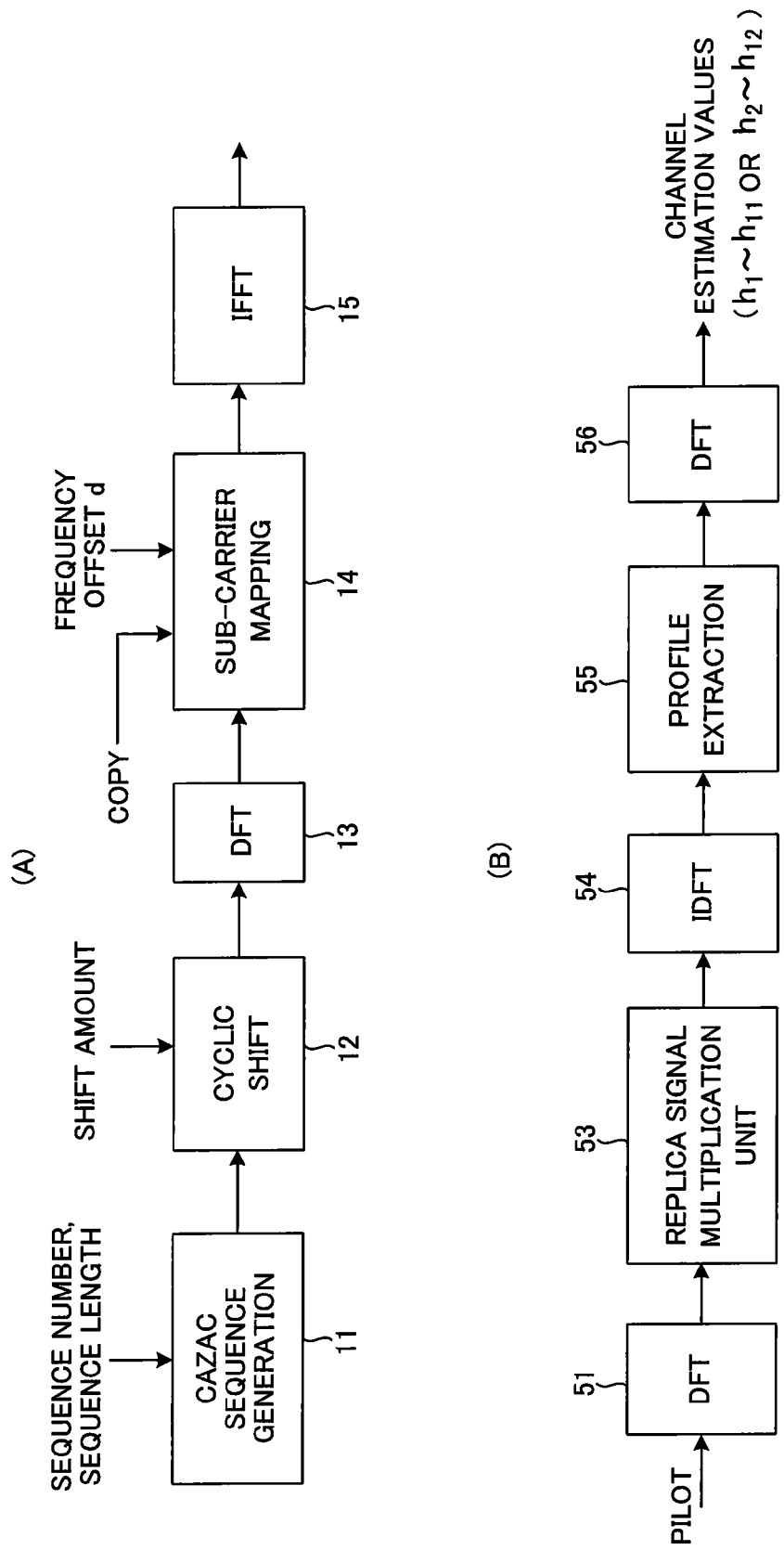
FIG. 17 is a drawing of the construction of a pilot generation unit and channel estimation unit that performs a second pilot generation process and channel estimation process.

(D) Second Pilot Generation Unit and Channel Estimation Unit (A) of FIG. 17 is a drawing showing the construction of a pilot generation unit that performs the second pilot generation process that was explained using FIG. 7, where the same reference numbers are given to parts that are the same as those of the pilot generation unit shown in (A) of FIG. 14. This pilot generation unit differs in that two operations, subcarrier mapping performed by the subcarrier mapping unit 14 based on the amount of frequency offset d, and copying of pilot components of specified subcarriers, are performed; the other operation is the same.

The CAZAC sequence generation unit 11 generates a CAZAC sequence $ZC_k(n)$ having an instructed sequence length L and sequence number k as a pilot, and the cyclic shift unit 12 performs a cyclic shift of the CAZAC sequence $ZC_k(n)$ a specified amount of c samples, then inputs the obtained sequence $ZC_k(n-c)$ to the DFT unit 13. For example, in the case of pilot 1 for user 1 as shown in (B) of FIG. 7, the cyclic shift unit 12 shifts $ZC_k(n)$ by the amount c1 to generate $ZC_k(n-c1)$, and in the case of pilot 2 for user 2, the cyclic shift unit 12 shifts $ZC_k(n)$ by the amount c2-s(k,d,L) to generate $ZC_k(n-c2+s(k,d,L))$, and inputs the results to the DFT unit 13. The $N_{TX}$ sized ($N_{TX}$=L) DFT unit 13 performs DFT processing on the pilot $ZC_k(n-c)$ to generate a frequency-domain pilot DFT$\{ZC_k(n-c)\}$.

The subcarrier mapping unit 14 performs subcarrier mapping based on copy information and frequency offset information that was specified from the transmission resource management unit 23. For example, for pilot 1 of user 1 shown in (B) of FIG. 7, the subcarrier mapping unit 14 performs the subcarrier mapping process shown in (A) of FIG. 8, and for pilot 2 of user 2 shown in (C) of FIG. 7, the subcarrier mapping unit 14 performs the subcarrier mapping shown in (B) of FIG. 8. The $N_{FFT}$ sized (for example, $N_{FFT}$=128) IFFT unit 15 performs IFFT processing on the subcarrier components that are input to convert the signal to a time-domain pilot signal, and inputs the result to the frame generation unit 26.

(B) of FIG. 17 is a drawing showing the construction of a channel estimation unit 34 that performs the second channel estimation process that was explained using FIG. 9, where the same reference numbers are given to parts that are the same as those of the channel estimation unit shown in FIG. 16. This channel estimation unit 34 differs in that the subcarrier addition unit 52 has been eliminated, and there is a predetermined multiplication process that is performed by a replica signal multiplication unit 53.

In addition to performing DFT processing on the pilot signal input from the separation unit 32, the DFT unit 51 converts the signal to a frequency-domain pilot signal (subcarrier components p1 to p12). In the case of pilot 1 from user 1, the replica signal multiplication unit 53 multiplies the components p1 to p11 of the subcarriers $f_i$, $f_{i+1}$, $f_{i+2}$, $f_{i+3}$, ..., $f_{i+10}$ of the received pilot that is output from the DFT unit 51 with the replica signals q1 to q11, and in the case of pilot 2 from user 2, multiplies the components p2 to p12 of the subcarriers $f_{i+1}$, $f_{i+2}$, $f_{i+3}$, ..., $f_{i+11}$ of the received pilot that is output from the DFT unit 51 with the replica signals.

After that, the IDFT unit 54 performs IDFT processing on the replica multiplication result and outputs a time-domain delay profile. The profile extraction unit 55 separates out the IDFT output signal at t=(c1+c2)/2, and in the case of a pilot signal from user 1, selects profile PRF1 (see FIG. 6), then the DFT unit 56 performs DFT processing on that profile PRF1 and outputs the channel estimation values h1 to h11. On the other hand, in the case of a received signal from user 2, the profile extraction unit 55 selects profile PRF2, then the DFT unit 56 performs DFT processing on profile PRF2 and outputs the channel estimation values h2 to h12.

Figure 18:
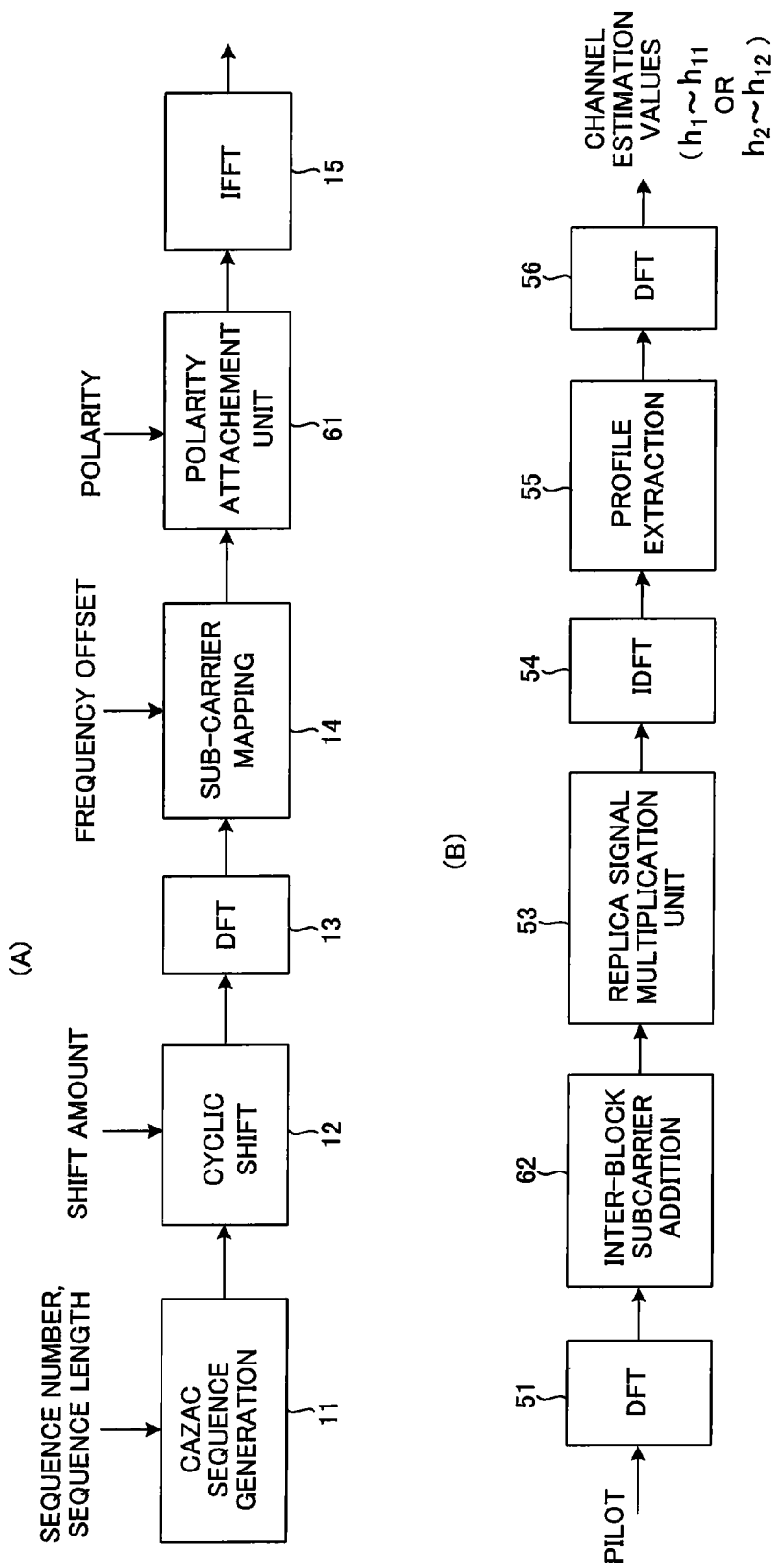
FIG. 18 is a drawing of the construction of a pilot generation unit and channel estimation unit that performs a third pilot generation process and channel estimation process.

(E) Third Pilot Generation Unit and Channel Estimation Unit (A) of FIG. 18 is a drawing showing the construction of a pilot generation unit that performs the third pilot generation process that was explained using FIG. 11, where the same reference numbers are given to parts that are the same as those of the pilot generation unit shown in (A) of FIG. 14. This pilot generation unit differs in that a polarity assignment unit 61 has been added; the other operation is the same.

The CAZAC sequence generation unit 11 generates a CAZAC sequence $ZC_k(n)$ having a specified sequence length L and sequence number k as a pilot, and the cyclic shift unit 12 performs a cyclic shift of the CAZAC sequence $ZC_k(n)$ by a specified amount of c samples, then inputs the obtained sequence $ZC_k(n-c)$ to the DFT unit 13. For example, in the case of pilot 1 for user 1 shown in (B) and (D) of FIG. 11, the cyclic shift unit 12 shifts $ZC_k(n)$ by just the amount c1 to generate $ZC_k(n-c1)$, and in the case of pilot 2 for user 2, the cyclic shift unit 12 shifts $ZC_k(n)$ by just the amount c2-s(k, d,L) to generate $ZC_k(n-c2+s(k, d, L))$, and inputs the result to the DFT unit 13. An $N_{TX}$ sized ($N_{TX}$=L) DFT unit 13 performs DFT processing on the input pilot $ZC_k(n-c)$ to generate a frequency-domain pilot DFT $\{ZC_k(n-c)\}$.

The subcarrier mapping unit 14 performs subcarrier mapping based on frequency offset information specified from the transmission resource management unit 23. The polarity attachment unit 61 attaches polarity that was specified from the transmission resource management unit 23 to the output from the subcarrier mapping unit 14, and inputs the result to the IFFT unit 15. For example, in the case of pilot 1 for user 1, a polarity of +1 is specified for the first and second pilot blocks (see (B) and (D) of FIG. 11), and the polarity attachment unit 61 multiplies all of the carrier components that are output from the subcarrier mapping unit 14 by +1 and inputs the result to the IFFT unit 15. Also, in the case of pilot 2 for user 2, the polarity of +1 is specified for the first pilot block, and −1 is specified for the second pilot block (see (C) and (E) of FIG. 11), so the polarity attachment unit 61 multiplies all of the carrier components that are output from the subcarrier mapping unit 14 by +1 for the first pilot block, and inputs the result to the IFFT unit 15, and by −1 for the second pilot block, and inputs the result to the IFFT unit 15.

The $N_{FFT}$ sized ($N_{FFT}$=128) IFFT unit 15 performs IFFT processing on the input subcarrier components to convert the signal to a time-domain pilot signal, then inputs the result to the frame generation unit 26.

(B) of FIG. 18 is a drawing showing the construction of a channel estimation unit 34 that performs the third channel estimation process that was explained using FIG. 12, where the same reference numbers are given to parts that are the same as those of the channel estimation unit shown in FIG. 16. This channel estimation unit differs in that an inter-block subcarrier addition unit 62 is provided instead of a subcarrier addition unit 52.

In addition to performing DFT processing on the pilot signal of the first pilot block that is input from the separation unit 32, the DFT unit 51 converts the signal to a frequency-domain pilot signal (subcarrier components p1 to p12), and the inter-block subcarrier addition unit 62 saves that pilot signal (subcarrier components p1 to p12) in an internal memory. After that, in addition to performing DFT processing on the pilot signal of the second pilot block that is input from the separation unit 32, the DFT unit 51 converts the signal to a frequency-domain pilot signal (subcarrier components p1 to p12), and inputs that signal to the inter-block subcarrier addition unit 62.

When receiving a pilot 1 from user 1, the inter-block subcarrier addition unit 62 adds the pilot signal (subcarrier components p1 to p12) of the saved first pilot block and pilot signal (subcarrier components p1 to p12) of second pilot block for each subcarrier. By doing so, the multiplexed pilot signal components from another user (for example, user 2) are removed. Moreover, when receiving a pilot 2 from user 2, the inter-block subcarrier addition unit 62 subtracts the pilot signal (subcarrier components p1 to p12) of the second pilot block from the pilot signal (subcarrier components p1 to p12) of the saved first pilot block for each subcarrier. By doing so, multiplexed pilot signal components from another user (for example, user 1) are removed.

When receiving a pilot 1 from user 1, the replica signal multiplication unit 53 multiplies the components p1 to p11 of the subcarriers $f_i, f_{i+1}, f_{i+2}, f_{i+3}, \ldots, f_{i+10}$ of the received pilot that is output from the inter-block subcarrier addition unit 62 with the replica signals q1 to q11, and when receiving a pilot 2 from user 2, multiplies the components p2 to p12 of the subcarriers $f_{i+1}, f_{i+2}, f_{i+3}, \ldots, f_{i+11}$ of the received pilot that is output from the inter-block subcarrier addition unit 62 with the replica signals q1 to q11.

After that, the IDFT unit 54 performs IDFT processing on the replica multiplication results, and outputs a time-domain pilot signal. The profile extraction unit 55 separates out the IDFT output signal at t=(c1+c2)/2, and in the case of a pilot signal from user 1, selects profile PRF1 (see FIG. 6), then the DFT unit 56 performs DFT processing on that profile PRF1 and outputs the channel estimation values h1 to h11. On the other hand, when the received signal is from user 2, the profile extraction unit 55 selects profile PRF2, then the DFT unit 56 performs DFT processing on that profile PRF2 and outputs the channel estimation values h2 to h12.

(F) Adaptive Control

As described above the uplink resource management unit 35 of the base station (see FIG. 15) decides the transmission frequency band for pilots, the CAZAC sequence number and sequence length L, cyclic shift amount, frequency offset d, and the like based on the propagation path condition of the mobile station, and notifies the mobile station. Moreover, the uplink resource management unit 35 of the base station also decides the multiplexing number in a transmission frequency band based on the propagation path condition of each mobile station.

Figure 19:
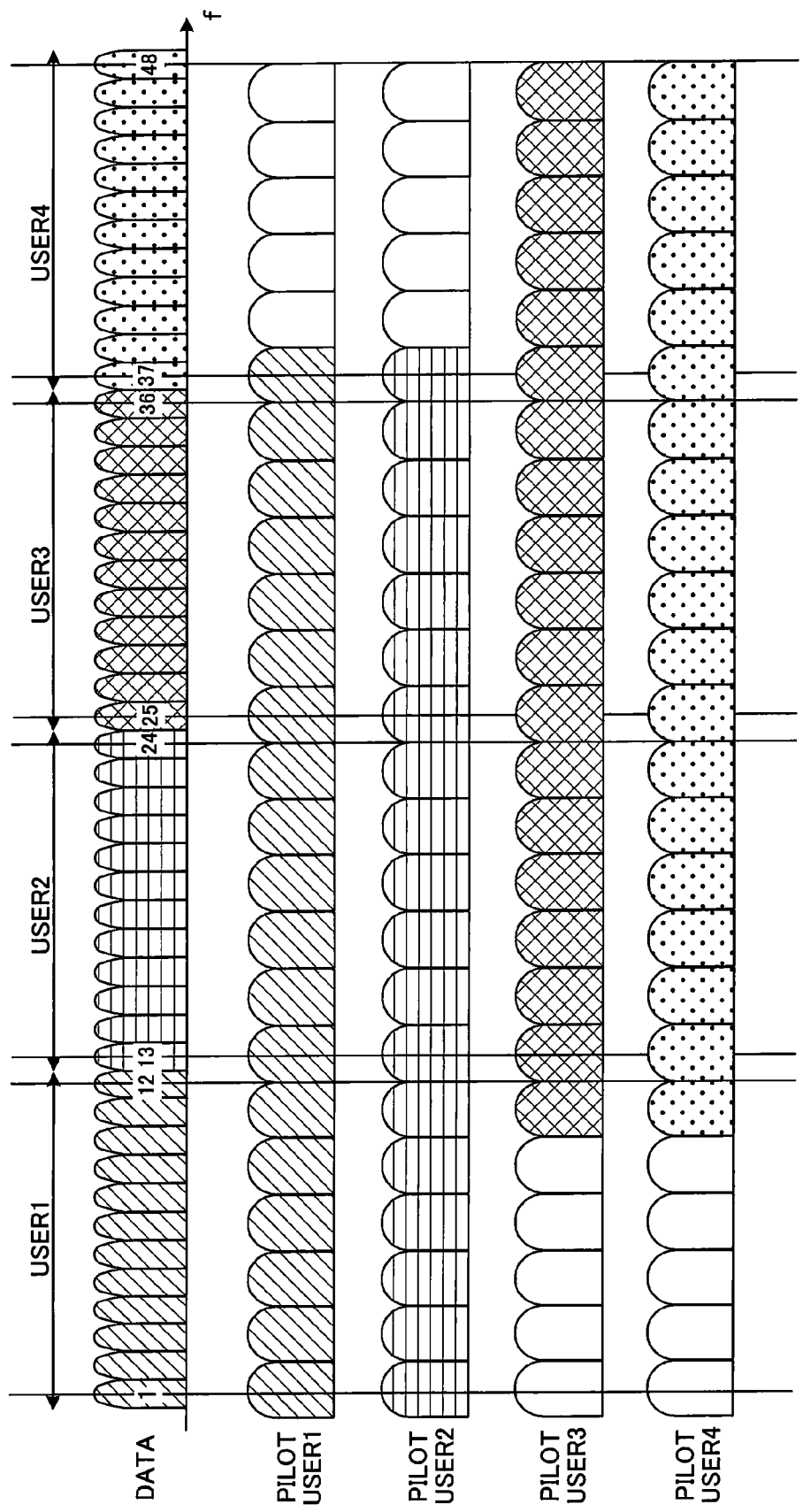
FIG. 19 is a drawing explaining the assignment of frequencies when the number of multiplexed pilots is 4.

FIG. 19 is a drawing explaining the frequency assignments when the multiplexing number is 4, where the first 12 subcarriers are assigned to user 1, the second 12 subcarriers are assigned to user 2, the third 12 subcarriers are assigned to user 3, and the last 12 subcarriers are assigned to user 4, and a CAZAC sequence $ZC_k(n)$ having a sequence length L=19 is used as the pilot for each user by changing the amount of cyclic shift.

The frequency offset of a pilot is decided such that the data transmission band for each user is covered by the pilot transmission band as much as possible. The cyclic shift unit 35a (see FIG. 15) calculates the amount of cyclic shift for each user according to the following equation.

$$c_i = c_p - s(k,d,L) \qquad (9)$$

Here, i and p express the data transmission band number and user number, respectively. Also, s(k,d,L) is the amount of cyclic shift for a sequence number k, sequence length L and frequency offset d, having the relationship given by the following equation.

$$k \cdot s(k,d,L) \equiv d \pmod{L} \qquad (10)$$

Here, $c_p$ for the pth user can be calculated by the following equation, for example.

$$c_p = (p-1) \times \lfloor L/P \rfloor \; p=1,2,P \qquad (11)$$

P expresses the number of pilots (number of users) that are multiplexed by cyclic shift. In the case shown in FIG. 19, the amounts of cyclic shift $c_1$ to $c_4$ for user 1 to user 4 become as shown below.

$$c_1 = 0$$

$$c_2 = \lfloor L/4 \rfloor$$

$$c_3 = \lfloor 2 \cdot L/4 \rfloor - s(k,d,L)$$

$$c_4 = \lfloor 3 \cdot L/4 \rfloor - s(k,d,L)$$

Incidentally, depending on the reception method for receiving pilot signals, the channel estimation characteristics on both ends of the pilot transmission band may be poor, and the channel estimation characteristics of the middle portion may be good. In other words, in the transmission band for subcarriers 1 to 12 and 37 to 48 in FIG. 19, the channel estimation accuracy may be poor, and in the transmission band for subcarriers 13 to 24 and 25 to 36, the channel estimation accuracy may be good.

Therefore, the middle of the transmission band for subcarriers 13 to 24 and 25 to 36 is assigned for users having a poor propagation path condition, and both ends of the transmission band for the subcarriers 1 to 12 and 37 to 48 are assigned to users having a good propagation path condition. By doing so, there are no users for which the channel estimation accuracy is extremely poor. FIG. 19 shows an example of assigning user 2 and user 3 to the middle transmission band.

Figure 20:
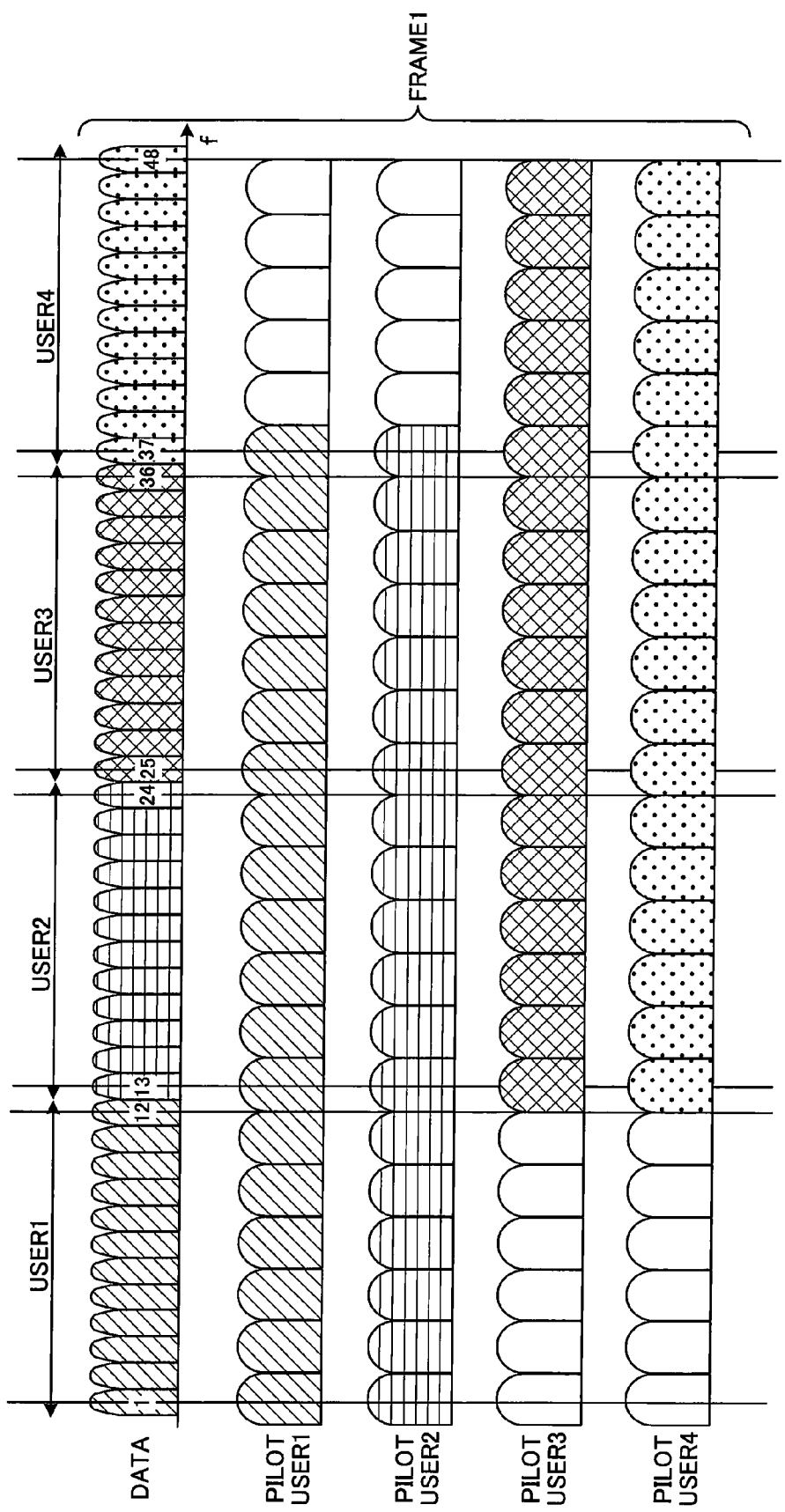
FIG. 20 is a drawing explaining hopping control so that the transmission bands that are assigned to the users are switched after each frame, and explains assignment for an odd numbered frame.
Figure 21:
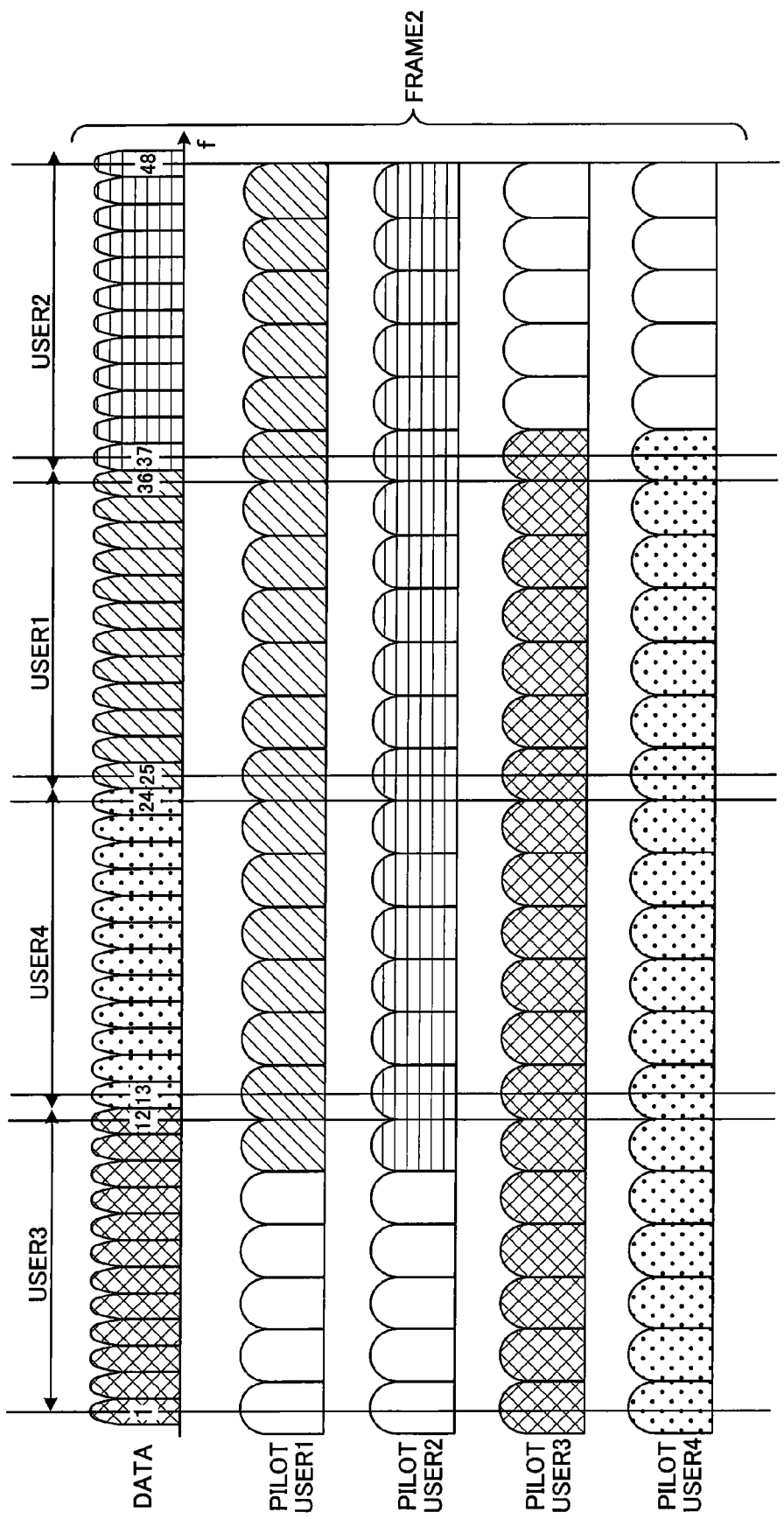
FIG. 21 is a drawing explaining hopping control so that the transmission bands that are assigned to the users are switched after each frame, and explains assignment for an even numbered frame.

Moreover, as shown in FIG. 20 and FIG. 21, it is possible to perform control (hopping control) so that the transmission band assigned to the users changes for each frame. FIG. 20 is a drawing explaining the assignment for an odd number frame, and FIG. 21 is a drawing explaining the assignment for an even number frame.

As shown in FIG. 20, for an odd number frame, the subcarriers 1 to 12 and 37 to 48 on both ends are assigned to user 1 and user 4, and the middle subcarriers 13 to 24 and 25 to 36 are assigned to user 2 and user 3. Also, as shown in FIG. 21, for an even number frame, the middle subcarriers 13 to 24 and 25 to 36 are assigned to user 4 and user 1, and the subcarriers 1 to 12 and 37 to 48 on both ends are assigned to user 3 and user 2. A frequency offset is applied to the pilots of user 3 and user 4 for an odd number frame, and a frequency offset is applied to the pilots of user 1 and user 2 for an even number frame. By doing so, there are no users for which the channel estimation accuracy is extremely poor.

Figure 22:
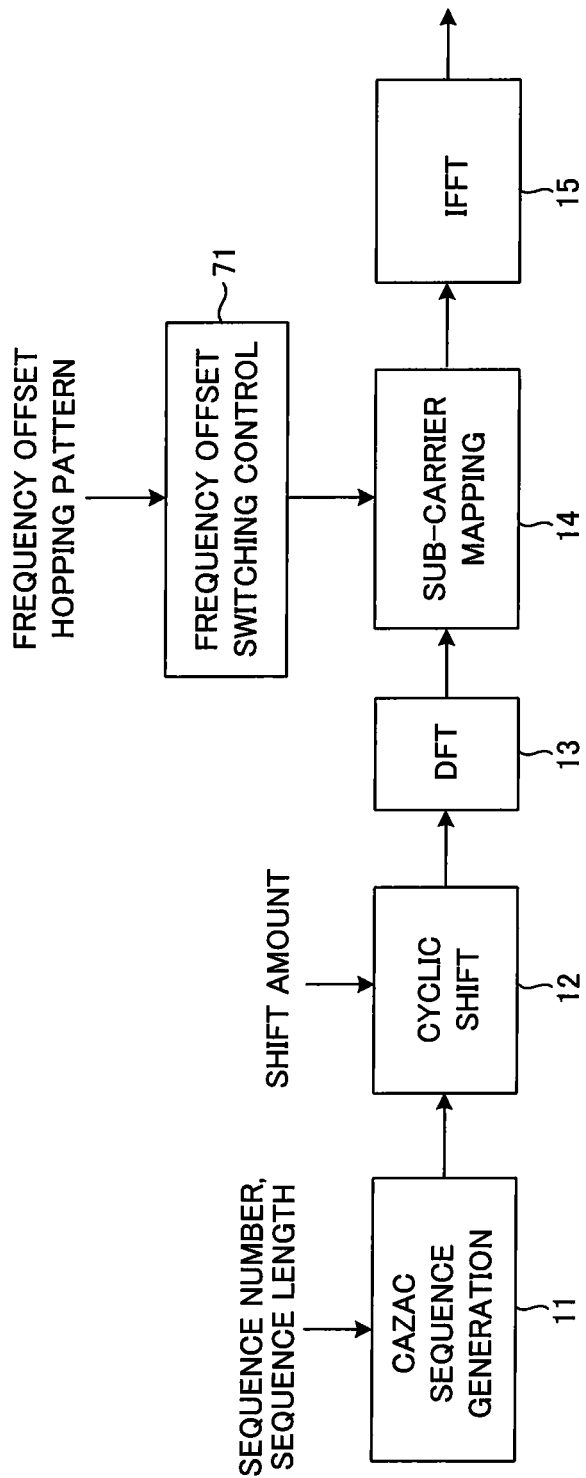
FIG. 22 is a drawing of the construction of the pilot generation unit when performing hopping control.
Figure 23:
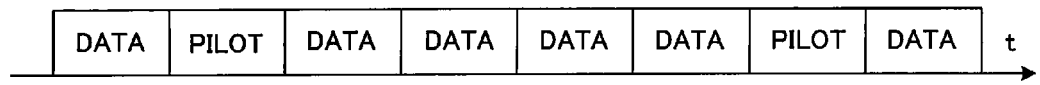
FIG. 23 is an example of frame format for single-carrier transmission.

FIG. 22 is a drawing showing the construction of a pilot generation unit when hopping control is performed, where the same reference numbers are given to parts that are the same as those of the pilot generation unit shown in (A) of FIG. 14. This pilot generation unit differs in that a frequency offset switching control unit 71 has been added; the other operation is the same.

The CAZAC sequence generation unit 11 generates a CAZAC sequence $ZC_k(n)$ having a specified sequence length L and sequence number k as a pilot, and a cyclic shift unit 12 performs a cyclic shift of the CAZAC sequence $ZC_k(n)$ by a specified amount of c samples, then inputs the obtained sequence $ZC_k(n-c)$ to the DFT unit 13. The $N_{TX}$ sized ($N_{TX}$=L) DFT unit 13 performs DFT processing on the input pilot $ZC_k(n-c)$ to generate a frequency-domain pilot DFT$\{ZC_k(n-c)\}$. The frequency offset switching control unit 71 decides whether or not to perform frequency offset based on the amount of frequency offset d and the hopping pattern specified from the transmission resource management unit 23. The subcarrier mapping unit 14 performs subcarrier mapping according to whether or not frequency offset is performed. The $N_{FFT}$ sized ($N_{FFT}$=128) IFFT unit 15 performs IDFT processing on the input subcarrier components to convert the signal to a time-domain pilot signal, and inputs the result to the frame generation unit 26.

EFFECT OF THE INVENTION

With the present invention described above, it is possible to perform channel estimation of data transmission subcarriers that deviate from the pilot transmission frequency band with good accuracy.

In addition, with the present invention, it is possible to perform channel estimation of data transmission subcarriers that are assigned to users even when cyclic shifting of differing amounts is performed on a specified sequence (for example the CAZAC sequence $ZC_k(n)$) as the pilot for users that will be multiplexed.

Moreover, with the present invention, it is possible to perform channel estimation by separating out the pilots of each user by a simple method, even when cyclic shifting of differing amounts is performed on a specified sequence as the pilot for users that will be multiplexed.

Furthermore, with the present invention, by assigning the middle portion of the pilot transmission band to users whose propagation path condition is poor, it is possible to improve the accuracy of channel estimation of data transmission subcarriers of a user, even though the propagation path condition of that user is poor.

Also, with the present invention, by performing hopping of the data transmission bands assigned to users between the middle portion and end portions of the pilot transmission band, it is possible to improve the accuracy of channel estimation of data transmission subcarriers of a user, even though the propagation path condition of that user is poor.

What is claimed is:

1. A user terminal in a radio communication system, in which each of user terminals performs multiplexing of a data signal and a pilot signal and transmits the multiplexed signal to a base station using different data transmission band frequencies that are assigned by the base station, the user terminal comprising:
   a receiving unit that receives uplink resource information from a base station;
   a pilot generation unit that generates a pilot signal based on the uplink resource information; and
   a transmitting unit that transmits the pilot signal generated by the pilot generation unit to the base station;
   wherein the pilot generation unit comprises:
      a sequence generation unit that generates a Zadoff-Chu sequence with a first sequence length of a prime number as a pilot signal based on the uplink resource information; and
      a subcarrier mapping unit that performs mapping of a sequence with a second sequence length which is longer than the first sequence length generated by cyclically copying the Zadoff-Chu sequence.

2. A communication method for user terminal in a radio communication system in which each of user terminals performs multiplexing of a data signal and a pilot signal and transmits the multiplexed signal to a base station using different data transmission band frequencies that are assigned by the base station, the communication method comprising:
   receiving uplink resource information from a base station; and
   generating a Zadoff-Chu sequence with a first sequence length of a prime number as a pilot signal based on the uplink resource information;
   performing mapping of a sequence with a second sequence length which is longer than the first sequence length generated by cyclically copying the Zadoff-Chu sequence; and
   transmitting the mapped pilot signal to the base station.

3. A radio communication system, in which each of user terminals performs multiplexing of a data signal and a pilot signal and transmits the multiplexed signal to a base station using different data transmission band frequencies that are assigned by the base station, the radio communication system comprising: the base station and the user terminals,
   wherein the base station includes:
   a first transmitting unit that transmits an uplink resource information to each of the user terminals; and
   wherein the each of the user terminals includes:
      a receiving unit that receives the uplink resource information from the base station;
      a pilot generation unit that generates a pilot signal based on the uplink resource information; and
      a second transmitting unit that transmits the pilot signal generated by the pilot generation unit to the base station;
   wherein the pilot generation unit comprises:
      a sequence generation unit that generates a Zadoff-Chu sequence with a first sequence length of a prime number as a pilot signal based on the uplink resource information; and
      a subcarrier mapping unit that performs mapping of a sequence with a second sequence length which is longer than the first sequence length generated by cyclically copying the Zadoff-Chu sequence.

\* \* \* \* \*